US008022009B2

(12) United States Patent
Huang et al.

(10) Patent No.: US 8,022,009 B2
(45) Date of Patent: Sep. 20, 2011

(54) PROCESS FOR SYNTHESIZING $Li_xFEMZO_4$/CARBON AND $Li_xMZO_4$/CARBON COMPOSITE MATERIALS

(75) Inventors: Biying Huang, Henderson, NV (US); Xiongfei Shen, Newark, CA (US); Yi-Qun Li, Danville, CA (US)

(73) Assignee: Intematix Corporation, Fremont, CA (US)

( * ) Notice: Subject to any disclaimer, the term of this patent is extended or adjusted under 35 U.S.C. 154(b) by 16 days.

(21) Appl. No.: 12/686,142

(22) Filed: Jan. 12, 2010

(65) Prior Publication Data

US 2010/0181529 A1 Jul. 22, 2010

Related U.S. Application Data

(60) Provisional application No. 61/145,496, filed on Jan. 16, 2009.

(51) Int. Cl.
*B01J 21/18* (2006.01)
*H01M 4/02* (2006.01)
*H01M 4/58* (2010.01)
*H01M 4/34* (2006.01)
*H01M 4/54* (2006.01)
*H01M 10/32* (2006.01)
*H01M 4/00* (2006.01)

(52) U.S. Cl. ............ 502/180; 429/209; 429/218.1; 429/219; 429/220; 429/221; 429/223; 429/231.5; 429/231.8; 429/231.95

(58) Field of Classification Search ............ 502/180; 429/209, 218.1, 219–221, 223, 231.5, 231.8, 429/231.95
See application file for complete search history.

(56) References Cited

U.S. PATENT DOCUMENTS

| | | | |
|---|---|---|---|
| 5,478,674 A * | 12/1995 | Miyasaka | 429/231.3 |
| 5,863,468 A | 1/1999 | Czubarow | |
| 6,814,764 B2 | 11/2004 | Hosoya | |
| 6,908,709 B2 * | 6/2005 | Miyaki | 429/231.4 |
| 6,960,331 B2 | 11/2005 | Barker | |
| 7,390,472 B1 * | 6/2008 | Singhal et al. | 423/306 |
| 7,390,473 B1 * | 6/2008 | Singhal et al. | 423/306 |
| 2002/0086214 A1 | 7/2002 | Barker | |
| 2008/0008938 A1 | 1/2008 | Wu | |
| 2009/0130558 A1 * | 5/2009 | Jouanneau et al. | 429/217 |
| 2011/0052981 A1 * | 3/2011 | Lopez et al. | 429/206 |

FOREIGN PATENT DOCUMENTS

WO   2010/083247 A1 *  7/2010

OTHER PUBLICATIONS

International Search Report dated Apr. 8, 2010, Application No. PCT/US2010/020939, 9 pages.

* cited by examiner

*Primary Examiner* — Patricia L Hailey
(74) *Attorney, Agent, or Firm* — Fliesler Meyer LLP

(57) ABSTRACT

The present invention provides a cost effective process of generating $Li_xM_yZO_4$/carbon composite material. Further, this novel method of preparation can be modified by adding a dopant and the calcinations can be carried out using microwave heating to reduce the synthesis time and cost. The $Li_xM_yZO_4$/carbon composite material can be used as a cathode for a secondary electrochemical cell. Selection of one or more metals in the cathode material can be used change the voltage, the capacity, and the energy density of the electrochemical cell.

19 Claims, 25 Drawing Sheets

PROCESS FOR SYNTHESIZING $LI_xFEMZO_4$/ CARBON AND $LI_xMZO_4$/ CARBON COMPOSITE MATERIALS

PRIORITY CLAIM

This application claims priority to: U.S. Provisional Patent Application No. 61/145,496, entitled: "PROCESS FOR SYNTHESIZING LixFeMZO4/CARBON AND LixMZO4/CARBON COMPOSITE MATERIALS", inventors: Biying Huang, Xiongfei Shen and Yi-Qun Li, filed Jan. 16, 2009. This application is herein expressly incorporated by reference in its entirety.

FIELD OF THE INVENTION

This invention is in the general field of a processing method for preparing cathode materials for a secondary electrochemical cell.

BACKGROUND OF THE INVENTION

In the rechargeable battery industry a variety of different cathode materials have been investigated. $LiCoO_2$ is the most common cathode material used today in commercial Li ion batteries, by virtue of its high working voltage and long cycle life. Although, $LiCoO_2$ is considered the cathode material of choice, the high cost, toxicity and relatively low thermal stability are features where the material has serious limitations as a rechargeable battery cathode. These limitations have stimulated a number of researchers to investigate methods of treating the $LiCoO_2$ to improve its thermal stability. However, the safety issue due to low thermal stability is still the critical limitation for $LiCoO_2$ cathode materials, especially when the battery is used in high charging-discharging rate conditions. Therefore, $LiCoO_2$ is not considered suitable as a cathode material in rechargeable batteries for transportation purposes and this has stimulated searches for alternative cathode material for use with electric vehicles and hybrid electric vehicles.

$LiFePO_4$ has been investigated as a very attractive alternative cathode material in rechargeable batteries due to its high thermal stability which makes it suitable for high rate charge-discharge applications in transportation devices and power tools. Batteries using $LiFePO_4$ as the cathode material have achieved market penetration in electric bicycles, scooters, wheel chairs and power tools.

SUMMARY OF THE INVENTION

Embodiments of the present invention are directed to cost effective methods of generating a composite active cathode of carbon and an ordered or modified olivine structure lithium iron phosphate based materials with superior electrochemical properties. Specific embodiments, as will be described below, are for use in a secondary electrochemical cell.

Most current $LiFePO_4$ materials still suffer from high impedance which will eventually limit the cycling life of a battery made from $LiFePO_4$. The impedance of the materials is highly related to synthesis methods and formulation of the materials such as the replacement of Fe or carbon coating. In addition, most known methods such as solid state reaction suffer from the high cost of the starting materials such as iron oxalate and ammonium dihydrogen phosphate. In addition milling processes require long processing times and involve complicated processing procedures. Batteries using $LiFePO_4$ as the cathode material also have a limitation of the relatively low practical voltage range (2.0-4.1 V). The use of iron phosphate compounds as anode materials for Li rechargeable batteries has been reported (D. Son et al., "Nanoparticle iron-phosphate anode material for Li-ion battery," Applied Physics Letters Volume 85, Number 24 (2004), pp. 5875-5877). The capacity of these synthesized nanoparticle iron phosphates was reported to be approximately three times higher than the ideal capacity of the $LiFePO_4$ cathode.

Therefore, the objective of this invention is to provide a method to synthesize ordered or modified olivine structure $LiMZO_4$/carbon composite electrode material with low impedance and high performance, where M can be Mg, Al, Si, Ca, Sc, Ti, V, Cr, Mn, Fe, Co, Ni, Cu, Zn, Ga, Ge, Sr, Zr, Nb, Mo, Ta, W, La, Ce, Pr, Nd, Pm, Sm, Eu, Gd, Tb, Dy, Ho, Er, Tm, Yb and Lu and other metal elements, and Z can be P, Si, S, Al, Ge, N, and V and other metalloid elements (hereinafter referred to as LMZO material).

In various embodiments of the invention, a cost effective process of generating a composite active electrode of LMZO material comprises reacting metal powder, such as iron, cobalt, manganese or mixtures thereof, with an aqueous based Z precursor, such as phosphorous pentoxide, silicone dioxide or a mixture thereof, drying the reaction intermediate, mixing the dried intermediate with a lithium precursor, adding a dopant, wherein the dopant is at least a M precursor, wherein the dopant is added when the metal powder is reacting with the Z precursor or after drying when the lithium precursor is being mixed and calcining the mixture in an inert or reducing environment under vacuum. In various embodiments of the invention, the metal powder is selected from the group consisting of metallic iron (Fe) powder, metallic cobalt (Co) powder, metallic manganese (Mn), metallic nickel (Ni) powder, and mixtures thereof. In various embodiments of the invention, Z is selected from the group consisting of P, Si, S, Al, Ge, N, and V elements and mixtures thereof, and the precursors of these elements can be $P_2O_5$, $H_3PO_4$, $SiO_2$, $H_2SiO_3$, $H_4SiO_4$, $NH_4HSiO_3$, $(NH_4)_2SiO_3$, $(NH4)_{4-w}H_w$-$SiO_4$ (where w=0, 1, 2 or 3), $H_2SO_4$ $NH_4HSO_4$, and $(NH_4)_2SO_4$ In various embodiments of the invention, the lithium precursor is selected from the group consisting of a carbamate salt, a hydroxide salt and an acetate salt. In various embodiments of the invention, the dopant is in the form of a salt or a metal and is selected from the group consisting of Mg, Al, Si, Ca, Sc, Ti, V, Cr, Mn, Fe, Co, Ni, Cu, Zn, Ga, Ge, Sr, Zr, Nb, Mo, Ta, W, La, Ce, Pr, Nd, Pm, Sm, Eu, Gd, Tb, Dy, Ho, Er, Tm, Yb and Lu. In various embodiments of the invention, the dopant can be a carbon precursor. In various embodiments of the invention, the carbon precursor is added after drying before the lithium precursor is added and mixed or before the calcining step.

In various embodiments of the invention, the process further comprises adding an accelerator when the metal powder is reacting with the Z precursor wherein the accelerator is selected from the group consisting of $O_2$, $H_2O_2$ and $Cl_2$. In various embodiments of the invention, the drying is carried out in the air at a temperature between a lower limit of approximately $1.5 \times 10^{2°}$ K and an upper limit of approximately $7.5 \times 10^{2°}$ K. In various embodiments of the invention, the carbon precursor is selected from the group consisting of carbon black, Super P® carbon, Super P Li™ carbon, one or more sugar molecules selected from the group consisting of monosaccharides, disaccharides and polysaccharides, including one or more sugar units selected from the group consisting of ribose, arabinose, xylose, lyxose, fructose, galactose, glucose and mannose, and one or more oxygen-carbon containing polymers selected from the group consisting of a polyether, a polyglycol, a polyester, polycaprolactone, polylactide, poly butylene succinate, poly butylene succinate adipate, polybutylene succinate terephthalate, poly-2-hydroxypropionate, poly-3-hydroxypropionate, poly-2-hydroxybutyrate, poly-3-hydroxybutyrate, poly-4-hydroxybutyrate, poly-3-hydroxyvalerate, poly-4-hydroxyvalerate, poly-5-hydroxyvalerate, poly-3-hydroxyhexanoate, poly-4-hydroxyhexanoate, poly-6-hydroxyhexanoate, poly-3-hydroxyoctanoate, poly-3-hydroxyphenylvaleric acid and poly-3-hydroxyphenylhexanoic acid.

In various embodiments of the invention, the calcination temperature is between a lower limit of approximately $7 \times 10^{2\circ}$ K and an upper limit of approximately $1.2 \times 10^3$ K. In various embodiments of the invention, the simplified and cost efficient process of generating a composite active cathode of LMZO material comprises reacting metal powder with a phosphorous, silicon, or sulfur (Z=P, Si, S, Al, Ge, N, and V) precursor in an aqueous based solvent, drying the reaction intermediate, mixing the dried reaction intermediate with a lithium precursor and calcining the mixture in an inert or reducing environment under vacuum. During heating, the octahedral sites in a LMZO material can expand more than the tetrahedral sites when the M-O bond is weaker than the M-Z bonds (where O designates the octahedral ligand). As a result, carrying out reactions in a vacuum can allow the use of lower calcining temperatures.

Abbreviations

Figure 1:
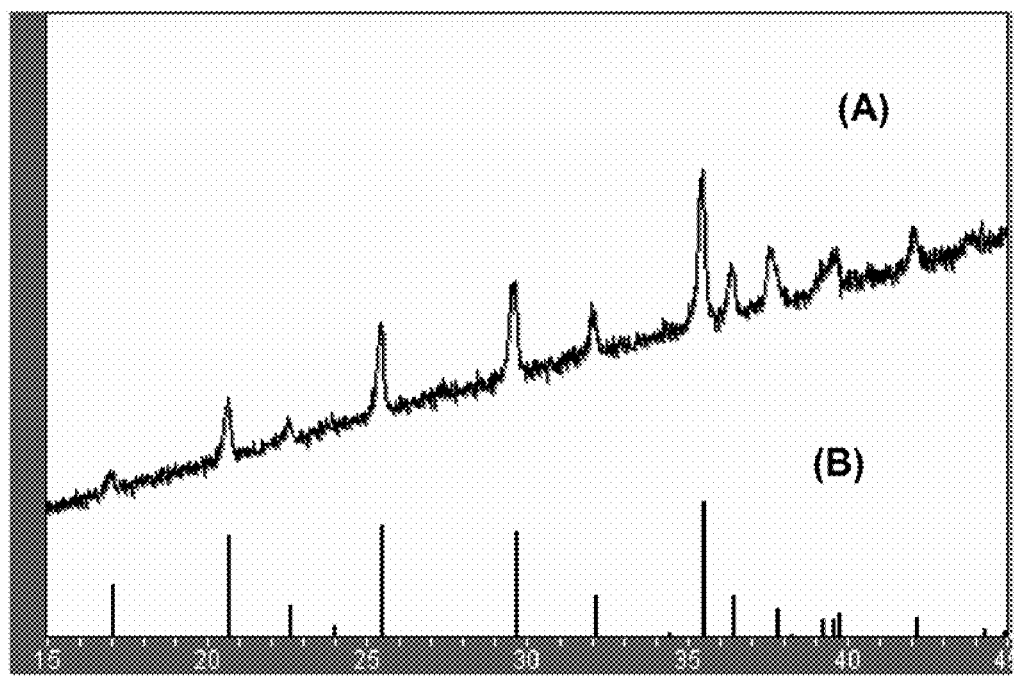
FIG. 1 shows the X-ray diffraction pattern of (A) the sample synthesized in Example 1 and (B) the reference pattern for the olivine structure, $LiFePO_4$ according to an embodiment of the invention.

The following abbreviations are used: EC=ethylene carbonate; DI=de-ionized water; DMC=dimethyl carbonate; PVDF=polyvinylidene fluoride; RT=room temperature; XRD=x-ray diffraction.

DETAILED DESCRIPTION OF THE INVENTION

The invention is illustrated by way of example and not by way of limitation in the figures of the accompanying drawings in which like references indicate similar elements. It should be noted that references to 'an' or 'one' embodiment in this disclosure are not necessarily to the same embodiment, and such references mean at least one. In the following description, various aspects of the present invention will be described. However, it will be apparent to those skilled in the art that the present invention may be practiced with only some or all aspects of the present invention. For purposes of explanation, specific numbers, materials, and configurations are set forth in order to provide a thorough understanding of the present invention. However, it will be apparent to one skilled in the art that the present invention may be practiced without the specific details. In other instances, well-known features are omitted or simplified in order not to obscure the present invention. Parts of the description will be presented in chemical synthesis terms, such as precursors, intermediates, product, and so forth, consistent with the manner commonly employed by those skilled in the art to convey the substance of their work to others skilled in the art. As well understood by those skilled in the art, these are labels, and may otherwise be manipulated through synthesis conditions. Various operations will be described as multiple discrete steps in turn, in a manner that is most helpful in understanding the present invention, however, the order of description should not be construed as to imply that these operations are necessarily order dependent. Various embodiments will be illustrated in terms of exemplary classes of precursors. It will be apparent to one skilled in the art that the present invention can be practiced using any number of different classes of precursors, not merely those included here for illustrative purposes. Furthermore, it will also be apparent that the present invention is not limited to any particular mixing paradigm.

Definitions

Definitions: a secondary battery is a rechargeable battery, also known as a storage battery, is a group of two or more secondary cells. Reaction is a process in which one or more substances are changed into others. Olivine is a mostly close packed hexagonal array of oxygen anions, with a metalloid group ($ZO_4$) occupying ⅛ of the tetrahedral sites, and the metal cations (M) occupying ½ of the octahedral sites, and two distinct octahedral sites designated O1 and O2, where O2 is slightly larger and slightly more distorted than O1. Ordered is a crystal structure where the atoms of different elements seek preferred lattice positions. Composite materials are engineered materials made from two or more constituent materials with significantly different physical or chemical properties of the reactants and which remain separate and distinct on a macroscopic level within the finished structure. Phase is a distinct state of matter in a system. Drying is a mass transfer process resulting in the removal of water moisture or moisture from another solvent, by evaporation from a solid, semi-solid or liquid (hereafter product) to end in a solid state. Adding is to join or combine or unite with other ingredients. Mixing is a unit operation that involves manipulating a heterogeneous physical system, with the intent to make it more homogeneous and defines steps to allow the constituent molecules from two or more ingredients in the heterogeneous system to become physically proximal or in contact. Blending defines the mixing of two or more compounds to allow the constituent molecules from the two or more compounds to become physically proximal or in contact. Grinding defines the use of use of a mortar and pestle to break up a compound into smaller pieces resulting in physically cleaving chemical and/or physical bonds within the compound. Milling defines the use of machinery with a rotating tool to break up a compound into smaller pieces resulting in physically cleaving chemical and/or physical bonds within the compound. Dry Milling refers to grinding of compounds in the absence of a liquid and in which the presence of water in the compound does not result in the accumulation of visually detectable water molecules on the surface of the compound. A Ball Mill is a type of grinder. It is a cylindrical device used in grinding or mixing of materials. Ball mills rotate around a horizontal axis, partially filled with the material to be ground plus the grinding media. Different materials are used as the grinding media including ceramic balls. An internal cascading effect reduces the material to a fine powder. Wet Slurry Milling refers to milling solid compound in the presence of a liquid, solution, suspension or colloid. A Wet Ball Mill Slurry refers to a ball mill in which the material is present together with a liquid, solution, suspension or colloid and the grinding media. Homogeneous slurry refers to the final state of a heterogeneous precursor system with two or more solid compounds, wherein the two or more compounds are distributed evenly in a liquid physical system, wherein analysis of any portion of the whole liquid physical system reveals equal amounts of the compounds making up the entire heterogeneous precursor system. A Sol Gel Slurry uses a colloidal solution, gelation and solvent removal techniques to prepare mixtures of inorganic solid composite materials from liquids. A Colloidal solution can be prepared by controlled precipitation and peptisation of inorganic precursors or by hydrolysis and polycondensation of metallic alkoxides. A metal or a "native metal" is a metal element in the zero oxidation state. Metal powder is a metal element in a physical powder state.

The performance of battery materials is highly dependent on the morphology, particle size, purity, and conductivity of the materials. Different material synthesis processes can readily produce materials with different morphology, particle size, purity, or conductivity. As a result, the performance of the battery materials is highly dependent on the synthesis process.

In order to improve the rechargeable battery performance and reduce the synthesis and production costs, different processing methods have been explored to synthesize $LiFePO_4$ type materials. Currently, the dominant production method is the ball mill method and using iron oxalate as a precursor. However, the processing cost of this method is very high especially due to the high cost of iron oxalate. In addition, as metal doping is needed, for example to control discharge voltage and improve conductivity, the ball mill method usually mixes dopant metal precursor(s) with iron oxalate. This kind of solid state mixing cannot achieve a homogeneous mixing of the dopant with other precursors. As a result, the quality and performance of the synthesized materials is negatively affected. These factors significantly limit the market for lithium electrodes synthesized using the ball mill production method.

For most current methods, the final calcination to achieve LMZO material phase is carried out with conventional furnace heating which requires longer calcinations time such as few hours to over 12 hours. In this conventional heating method, because of relatively long heating time, significant particle aggregation can result. In addition, conventional heating methods result in increased energy consumption and thus increased cost.

The safety issue of $LiCoO_2$ cathode materials and the high cost of reactants in the conventional method of producing the $LiFePO_4$ type materials significantly limit the available market for Li ion rechargeable batteries. This situation is exacerbated by the pursuit of low production cost means of manufacturing $LiFePO_4$ materials.

In various embodiments of the invention, metal powder is used as the precursor to generate LMZO material, such as $LiFePO_4$, $LiCoPO_4$. This can be very attractive as it can produce high performance materials with low cost. This is essentially because of the low cost of metal powder, such as Fe and Co metals compared to their salts or oxides, such as iron oxalate and cobalt oxide. Known methods for generating $FePO_4$ or $LiFePO_4$ have many processing steps. The numerous processing steps result in a high production cost. In addition, the numerous processing steps make it difficult for fine control. In addition, when iron metal powder is used, it is necessary to have a process to completely dissolve and react the iron powder. If the process does not insure complete dissolution and thereby reaction of the iron powder, iron powder residue is readily observed in the resulting product. The presence of even minute amounts of iron in an electrode will reduce the capacity and cycle life of the electrode material. These problems are present in the previously reported processes to produce $LiMPO_4$ type materials. Further, no process has been developed to address the reduced capacity and cycle life of inhomogeneous cathode materials. In an embodiment of the present invention, microwave calcinations can be used in a process to synthesize LiFePO4 olivine phase compounds to significantly reduce the processing time and cost.

In various embodiments of the invention, a simplified and cost efficient process to synthesize LMZO material can be accomplished by using metal powder and at least one compound selected from the group consisting of $P_2O_5$, $H_3PO_4$, $SiO_2$, $H_2SiO_3$, $H_4SiO_4$, $NH_4HSiO_3$, $(NH_4)_2SiO_3$, $(NH4)_{4-w}H_wSiO_4$ (where w=0, 1, 2, or 3), $H_2SO_4$ $NH_4HSO_4$, and $(NH_4)_2SO_4$ $Al_2O_3$, $Al(OH)_3$, $AlNH_4(SO_4)_2$, $GeSe_2$, $GeO$, $GeO_2$, $Ge_2O_3$, $Ge_2O_7$, $SiGeO_2$, $HNO_3$, $NH_3$, $Q_3N_2$ (where Q is a divalent metal), $R_3N$ (where R is a monovalent metal), $V_2O_3$, $VO_2$, $VO$, $V_2O_5$, $VOSO_4$, $NaVO_3$, and $Na_3VO_4$ as the precursors. In the general formula $Li_xMZO_4$, where $0<x\leq1$, M is at least one metal selected from one of the following groups: (i) a $1^{st}$ row transition metal, (ii) Al, Ga, Si, Ge, Mg, Ca, Sr, (iii) Zr, Nb, Ta, Mo, W and (iv) a rare earth metal, and Z is at least one element selected from the group consisting of P, Si, S, Al, Ge, N, and V. In an embodiment of the invention, a simplified process synthesizes pure $LiMPO_4$, where M is Fe, Mn, Co, or Ni. In an embodiment of the invention, a simplified process synthesizes $LiMPO_4$, where M is at least one metal. In an embodiment of the invention, a simplified process synthesizes $LiMZO_4$, where M is at least one metal, Z is $P_{1-m-n-q-r-t-u}Si_mS_nAl_qGe_rN_tV_u$ and $0 \leq m, n, q, r, t, u \leq 1$. A major advantage of this invention is the low cost due to simplified process with use of metal powder as precursor. This process is suitable for mass production of cathode material. In addition, the process can produce homogeneous pure metal and mixed metal $LiMPO_4$ because it involves the co-dissolution of metal precursors to form a homogeneous slurry.

In an embodiment of the invention, a method of producing LMZO active electrode material for secondary battery comprises reacting metal powder with at least one from P, Si, S, Al, Ge, N, and V precursor in an aqueous based solvent, drying the reaction, mixing the dried reaction with a lithium precursor and calcinating the mixture with heating in an inert or reducing environment under vacuum. In various embodiments of the invention, heating includes one or more of convection heating, conduction heating and microwave heating.

In an embodiment of the invention, a method of producing LMZO active electrode material for secondary battery comprises reacting metallic metal powder with at least one $ZO_4$ precursor where Z is selected from P, Si, S, Al, Ge, N, and V and the $ZO_4$ precursor can be selected from the group consisting of $P_2O_5$, $NH_4H_2PO_4$, $(NH_4)_2HPO4$, $H_3PO_4$, $SiO_2$, $H_2SiO_3$, $H_4SiO_4$, $NH_4HSiO_3$, $(NH_4)_2SiO_3$, $(NH4)_{4-w}H_w$-$SiO_4$ (where w=0, 1, 2, or 3), $H_2SO_4$ $NH_4HSO_4$, and $(NH_4)_2SO_4$ $Al_2O_3$, $Al(OH)_3$, $AlNH_4(SO_4)_2$, $GeSe_2$, $GeO$, $GeO_2$, $Ge_2O_3$, $Ge_2O_7$, $SiGeO_2$, $HNO_3$, $NH_3$, $Q_3N_2$ (where Q is a divalent metal), $R_3N$ (where R is a monovalent metal), $V_2O_3$, $VO_2$, $VO$, $V_2O_5$, $VOSO_4$, $NaVO_3$, and $Na_3VO_4$ in an aqueous based solvent, drying the reaction, mixing the dried reaction with a lithium precursor and calcining the mixture with heating in an inert or reducing environment under vacuum.

In an embodiment of the invention, a method of producing LMZO active electrode material for secondary battery comprises reacting metallic metal powder with at least one from P, Si, S, Al, Ge, N, and V precursor in an aqueous based solvent, drying the reaction, mixing the dried reaction with a lithium precursor selected from the group consisting of a carbamate salt, a hydroxide salt and an acetate salt and calcining the mixture with heating in an inert or reducing environment under vacuum.

In an embodiment of the invention, a method of producing LMZO active electrode material for secondary battery comprises reacting metal powder with at least one from P, Si, S, Al, Ge, N, and V precursor in an aqueous based solvent, drying the reaction, mixing the dried reaction with a lithium precursor, adding a dopant either during the reaction between the metal(s) and P, Si, S, Al, Ge, N, and V or before the mixing step and calcining the mixture with heating in an inert or reducing environment under vacuum.

In an embodiment of the invention, a method of producing LMZO active electrode material for secondary battery comprises reacting metal (M) powder with at least one $ZO_4$ precursor where Z is selected from P, Si, S, Al, Ge, N, and V and the $ZO_4$ precursor can be selected from the group consisting of $P_2O_5$, $H_3PO_4$, $SiO_2$, $H_2SiO_3$, $H_4SiO_4$, $NH_4HSiO_3$, $(NH_4)_2SiO_3$, $(NH4)_{4-w}H_wSiO_4$ (where w=0, 1, 2 or 3), $H_2SO_4$ $NH_4HSO_4$, $(NH_4)_2SO_4$ $Al_2O_3$, $Al(OH)_3$, $AlNH_4(SO_4)_2$, $GeSe_2$, $GeO$, $GeO_2$, $Ge_2O_3$, $Ge_2O_7$, $SiGeO_2$, $HNO_3$, $NH_3$, $Q_3N_2$ (where Q is a divalent metal), $R_3N$ (where R is a monovalent metal), $V_2O_3$, $VO_2$, $VO$, $V_2O_5$, $VOSO_4$, $NaVO_3$, and $Na_3VO_4$ in an aqueous based solvent, drying the reaction, mixing the dried reaction with a lithium precursor, adding a dopant either during the reaction between the metal and Z precursor or before the mixing step and calcining the mixture with heating in an inert or reducing environment under vacuum.

In an embodiment of the invention, a method of producing LMZO active electrode material for secondary battery comprises reacting metallic iron powder with a phosphorous precursor in an aqueous based solvent, drying the reaction, mixing/milling the dried reaction with a lithium precursor selected from the group consisting of a carbonate salt, a hydroxide salt and an acetate salt, adding a dopant either during the reaction between the iron and phosphorous or before the mixing step and calcining the mixture with heating in an inert or reducing environment under vacuum.

In an embodiment of the invention, a method of producing LMZO active electrode material for secondary battery comprises reacting metallic (M) powder with a $ZO_4$ precursor in an aqueous based solvent, drying the reaction, mixing the dried reaction with a lithium precursor, adding a dopant either during the reaction between the metal powder and at least one $ZO_4$ precursor where Z is selected from P, Si, S, Al, Ge, N, and V or before the mixing step wherein the dopant is selected from the group consisting of a 1st row transition metal, Al, Ga, Si, Ge, Mg, Ca, Sr, Zr, Nb, Ta, Mo, W and a rare earth metal, and calcining the mixture with heating in an inert or reducing environment under vacuum.

In an embodiment of the invention, a reaction accelerator selected from the group consisting of $O_2$, $H_2O_2$, $Cl_2$, and $HClO_4$, can be used to accelerate the reaction between the metal powder and the Z precursor.

In an embodiment of the invention, a method of producing a LMZO comprising reacting at least one M precursor with at least one $ZO_4$ precursor in an aqueous based solvent, wherein M has an oxidation state less than one, wherein Z is selected from the group consisting of P, Si, S, Al, Ge, N, V; drying the reaction, mixing the dried reaction with a lithium precursor, adding one or both a dopant and a carbon precursor to the mixture, wherein the dopant is at least a M precursor, wherein M is a metal element and calcining the doped mixture.

In an alternative embodiment of the invention, a method of producing a LMZO comprising reacting at least one M precursor with at least one $ZO_4$ precursor in an aqueous based solvent, wherein M has an oxidation state less than one, wherein Z is selected from the group consisting of P, Si, S, Al, Ge, N, V; drying the reaction, mixing the dried reaction with a lithium precursor, adding one or both a dopant and a carbon precursor to the mixture, wherein the dopant is at least a M precursor, wherein M is a metal element and calcining the doped mixture, wherein the M precursor is one or more of a powder and the M precursor added to $ZO_4$ is selected from the group consisting of Fe, Co, Ni, and Mn.

In another embodiment of the invention, a method of producing a LMZO comprising reacting at least one M precursor with at least one $ZO_4$ precursor in an aqueous based solvent, wherein M has an oxidation state less than one, wherein Z is selected from the group consisting of P, Si, S, Al, Ge, N, V; drying the reaction, mixing the dried reaction with a lithium precursor, adding one or both a dopant and a carbon precursor to the mixture, wherein the dopant is at least a M precursor, wherein M is a metal element and calcining the doped mixture, wherein Z is one or more of either phosphorous and the $PO_4$ precursor is selected from the group consisting of $P_2O_5$ and $H_3PO_4$; silicon and the $SiO_4$ precursor is selected from the group consisting of $SiO_2$, $H_2SiO_3$, $H_4SiO_4$, $NH_4HSiO_3$, $(NH_4)_2SiO_3$ and $(NH4)_{4-w}H_wSiO_4$ (where w=0, 1, 2 or 3); sulfur and the $SO_4$ precursor is selected from the group consisting of $H_2SO_4$, $NH_4HSO_4$, and $(NH_4)_2SO_4$; aluminum and the $AlO_4$ precursor is selected from the group consisting of $Al_2O_3$, $Al(OH)_3$ and $AlNH_4(SO_4)_2$; germainum and the $GeO_4$ precursor is selected from the group consisting of $GeSe_2$, $GeO$, $GeO_2$, $Ge_2O_3$, $Ge_2O_7$ and $SiGeO_2$; nitrogen and the $NO_4$ precursor is selected from the group consisting of $HNO_3$, $NH_3$, $Q_3N_2$ (where Q is a divalent metal) and $R_3N$ (where R is a monovalent metal) and vanadium and the $GeO_4$ precursor is selected from the group consisting of $V_2O_3$, $VO_2$, $VO$, $V_2O_5$, $VOSO_4$, $NaVO_3$, and $Na_3VO_4$.

In a different embodiment of the invention, a method of producing a LMZO comprising reacting at least one M precursor with at least one $ZO_4$ precursor in an aqueous based solvent, wherein M has an oxidation state less than one, wherein Z is selected from the group consisting of P, Si, S, Al, Ge, N, V; drying the reaction, mixing the dried reaction with a lithium precursor, adding one or both a dopant and a carbon precursor to the mixture, wherein the dopant is at least a M precursor, wherein M is a metal element and calcining the doped mixture, wherein one or both of the dopant is the same as the M precursor reacted the $ZO_4$ precursor and the dopant referred is added to the lithium precursor.

In another embodiment of the invention, a method of producing a LMZO comprising reacting at least one M precursor with at least one $ZO_4$ precursor in an aqueous based solvent, wherein M has an oxidation state less than one, wherein Z is selected from the group consisting of P, Si, S, Al, Ge, N, V; drying the reaction, mixing the dried reaction with a lithium precursor, adding one or both a dopant and a carbon precursor to the mixture, wherein the dopant is at least a M precursor, wherein M is a metal element and calcining the doped mixture, further comprising adding an accelerator to the M precursor and $ZO_4$ precursor, wherein the accelerator is selected from the group consisting of $O_2$, $H_2O_2$, $HClO_4$, and $Cl_2$.

In an alternative embodiment of the invention, a method of producing a LMZO comprising reacting at least one M precursor with at least one $ZO_4$ precursor in an aqueous based solvent, wherein M has an oxidation state less than one, wherein Z is selected from the group consisting of P, Si, S, Al, Ge, N, V; drying the reaction, mixing the dried reaction with a lithium precursor, adding one or both a dopant and a carbon precursor to the mixture, wherein the dopant is at least a M precursor, wherein M is a metal element and calcining the doped mixture, wherein one or more of the reaction between M precursor and the $ZO_4$ precursor occurs in a wet ball mill slurry, the drying step after M precursor and the $ZO_4$ precursor have reacted is carried out in air and the mixing with the lithium precursor includes one or more of grinding, milling and blending.

In a varying embodiment of the invention, a method of producing a LMZO comprising reacting at least one M precursor with at least one $ZO_4$ precursor in an aqueous based solvent, wherein M has an oxidation state less than one, wherein Z is selected from the group consisting of P, Si, S, Al, Ge, N, V; drying the reaction, mixing the dried reaction with a lithium precursor, adding one or both a dopant and a carbon precursor to the mixture, wherein the dopant is at least a M precursor, wherein M is a metal element and calcining the doped mixture wherein one or more of the drying after M precursor and the $ZO_4$ precursor have reacted is carried out at a temperature between a lower limit of approximately $1.5 \times 10^{2°}$ K and an upper limit of approximately $7.5 \times 10^{2°}$ K, the lithium precursor is selected from the group consisting of a carbamate salt, a hydroxide salt and an acetate salt, and wherein the carbon is uniformly dispersed throughout the composite material produced.

In another embodiment of the invention, a method of producing a LMZO comprising reacting at least one M precursor with at least one $ZO_4$ precursor in an aqueous based solvent, wherein M has an oxidation state less than one, wherein Z is selected from the group consisting of P, Si, S, Al, Ge, N, V; drying the reaction, mixing the dried reaction with a lithium precursor, adding one or both a dopant and a carbon precursor to the mixture, wherein the dopant is at least a M precursor, wherein M is a metal element and calcining the doped mixture, wherein the dopant added is one or more of a metal, a salt, an oxide, and selected from the group consisting of Mg, Al, Si, Ca, Sc, Ti, V, Cr, Mn, Fe, Co, Ni, Cu, Zn, Ga, Ge, Sr, Zr, Nb, Mo, Ta, W, La, Ce, Pr, Nd, Pm, Sm, Eu, Gd, Tb, Dy, Ho, Er, Tm, Yb and Lu.

In various embodiment of the invention, a method of producing a LMZO comprising reacting at least one M precursor with at least one $ZO_4$ precursor in an aqueous based solvent, wherein M has an oxidation state less than one, wherein Z is selected from the group consisting of P, Si, S, Al, Ge, N, V; drying the reaction, mixing the dried reaction with a lithium precursor, adding one or both a dopant and a carbon precursor to the mixture, wherein the dopant is at least a M precursor, wherein M is a metal element and calcining the doped mixture, wherein the carbon precursor is one or more of added before one or both the mixing with the lithium precursor and the calcining step, selected from the group consisting of carbon black, Super P carbon and Super P Li carbon, selected from one or more sugar molecules selected from the group consisting of monosaccharides, disaccharides and polysaccharides, including one or more sugar units selected from the group consisting of ribose, arabinose, xylose, lyxose, fructose, galactose, glucose and mannose and selected from one or more oxygen and carbon containing polymers selected from the group consisting of one or more of polyether, polyglycol, polyester, polyethylene, poly(halogen)ethylene (where polyhalogen ethylene includes polyfluoroethylene and polychoroethylene), polypropylene, polyvinylidene halogen, polymethylmethacrylate, polyacrylonide, polycaprolactone, polylactide, poly butylene succinate, polybutylene succinate adipate, polybutylene succinate terephthalate, poly-hydroxypropionate, poly-hydroxybutyrate, poly-hydroxyvalerate, poly-hydroxyhexanoate, poly-3-hydroxyoctanoate, poly-3-hydroxyphenylvaleric acid and poly-3-hydroxyphenylhexanoic acid.

In a different embodiment of the invention, a method of producing a LMZO comprising reacting at least one M precursor with at least one $ZO_4$ precursor in an aqueous based solvent, wherein M has an oxidation state less than one, wherein Z is selected from the group consisting of P, Si, S, Al, Ge, N, V; drying the reaction, mixing the dried reaction with a lithium precursor, adding one or both a dopant and a carbon precursor to the mixture, wherein the dopant is at least a M precursor, wherein M is a metal element and calcining the doped mixture, wherein the calcination is carried out with one or more conditions selected from the group consisting of an inert environment, a reducing environment, under vacuum, using microwave heating, using convection heating, using conduction heating and wherein the calcining temperature is between a lower limit of approximately $7 \times 10^{2°}$ K and an upper limit of approximately $1.2 \times 10^{3°}$ K.

In another embodiment of the invention, a method of producing a LMZO comprising reacting at least one M precursor with at least one $ZO_4$ precursor in an aqueous based solvent, wherein M has an oxidation state less than one, wherein Z is selected from the group consisting of P, Si, S, Al, Ge, N, V; drying the reaction, mixing the dried reaction with a lithium precursor, adding one or both a dopant and a carbon precursor to the mixture, wherein the dopant is at least a M precursor, wherein M is a metal element and calcining the doped mixture, wherein the calcination is carried out with two or more conditions selected from the group consisting of an inert environment, a reducing environment, under vacuum, using microwave heating, using convection heating, using conduction heating and wherein the calcining temperature is between a lower limit of approximately $7 \times 10^{2°}$ K and an upper limit of approximately $1.2 \times 10^{3°}$ K.

In an alternative embodiment of the invention, a method of producing a LMZO comprising reacting at least one M precursor with at least one $ZO_4$ precursor in an aqueous based solvent, wherein M is a metal element and Z is selected from the group consisting of P, Si, S, Al, Ge, N, and V, drying the reaction, mixing the dried reaction with a lithium precursor, milling the mixture in a ball mill, adding one or both a dopant and a carbon precursor to the mixture, wherein the dopant is at least a M precursor, wherein M is a metal element, wherein the dopant is not the M precursor reacted with the $ZO_4$ precursor and calcining the doped mixture in an inert or reducing environment.

In an alternative embodiment of the invention, a method of producing a LMZO comprising reacting at least one M precursor with at least one $ZO_4$ precursor in an aqueous based solvent, wherein M is a metal element and Z is selected from the group consisting of P, Si, S, Al, Ge, N, and V, drying the reaction, mixing the dried reaction with a lithium precursor, milling the mixture in a ball mill, adding one or both a dopant and a carbon precursor to the mixture, wherein the dopant is at least a M precursor, wherein M is a metal element, wherein the dopant is not the M precursor reacted with the $ZO_4$ precursor and calcining the doped mixture in an inert or reducing environment, wherein the M precursor reacted with $ZO_4$ precursor is one or more of in a metallic form with an oxidation state of zero, a powder and selected from the group consisting of Fe, FeO, $Fe_2O_3$, $Fe_3O_4$, $Fe_2O_5$, Co, CoO, $Co_2O_3$, $Co_3O_4$, Ni, NiO, $Ni_2O_3$, $NiO_2H$, Mn, MnO, $MnO_2$, $Mn_2O_3$, $MnO_3$, $MnO_6$, $Mn_2O_7$, $Mn_3O_4$ and $Mn_5O_8$.

Previous Process

Previously, it has been shown that $FeC_2O_4 + LiCO_3 + NH_4H_2PO_4$ can be reacted to form $LiFePO_4$. However the cost of the many of the reagents and in particular the $FeC_2O_4$ and the $NH_4H_2PO_4$ is high. Alternatively, it has been shown that $FePO_4 + LiCO_3$ can be reacted to form $LiFePO_4$. However, the reaction between $FePO_4$ and $LiCO_3$ does not produce a homogeneous material. Further, the reaction can be difficult to control when carried out to produce material with reduced particulate size. Finally, $LiFePO_4$ synthesized from $FePO_4 + LiCO_3$ results in micro particles rather than nano particles sizes.

EXAMPLE 1

Undoped $LiFePO_4$/Carbon

In an embodiment of the invention, $LiFePO_4$/carbon can be synthesized as follows: 16.8 g of iron powder (−325 mesh, Alfa Aesar, 98% purity) was mixed with 21.3 g of $P_2O_5$ (98%, Acros Organics). Then 200 mL of DI (de-ionized) water was added to the mixture drop wise with vigorous stirring. To promote the reaction of Fe powder, $H_2O_2$ (35% solution in water, Alfa Aesar) was added to the wet slurry after addition of DI water was completed. The obtained wet ball mill slurry was then mixed and dried in air at RT (room temperature). The dried mixture was then mixed in a ball mill with 7.4 g of $Li_2CO_3$ (Alfa Aesar, 99% purity) and 1.5 g of Super P Li™ carbon to obtain a homogeneous mixture. After milling, the mixture was calcined at the final temperature ($1 \times 10^{3°}$ K) in inert gas flow to obtain the final $LiFePO_4$/carbon composite materials. In various embodiments of the invention, the mixture can be calcined above a lower limit of approximately $7 \times 10^{2°}$ K. In various embodiments of the invention, the mixture can be calcined up to an upper limit of approximately $1.2 \times 10^{3°}$ K.

Figure 2A:
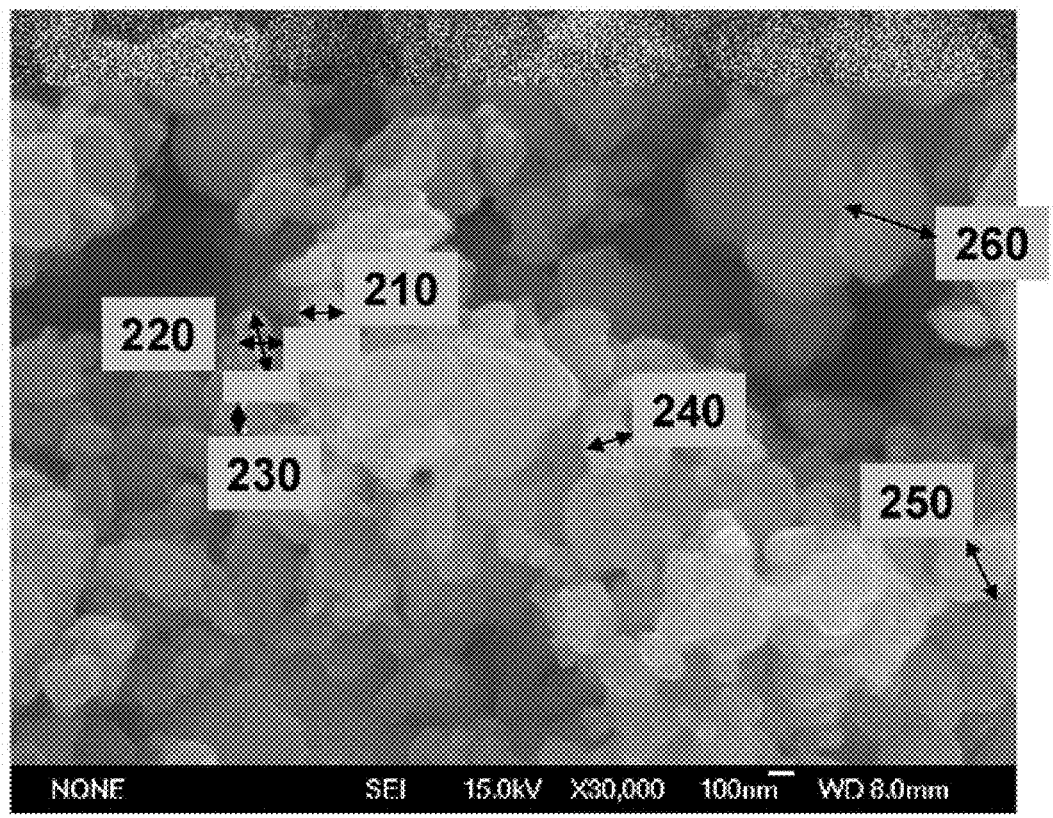
FIG. 2 shows a scanning electron micrograph image of the sample synthesized in Example 1 according to an embodiment of the invention at (A) a magnification 30,000× and (B) a magnification 5,000×.
Figure 2B:
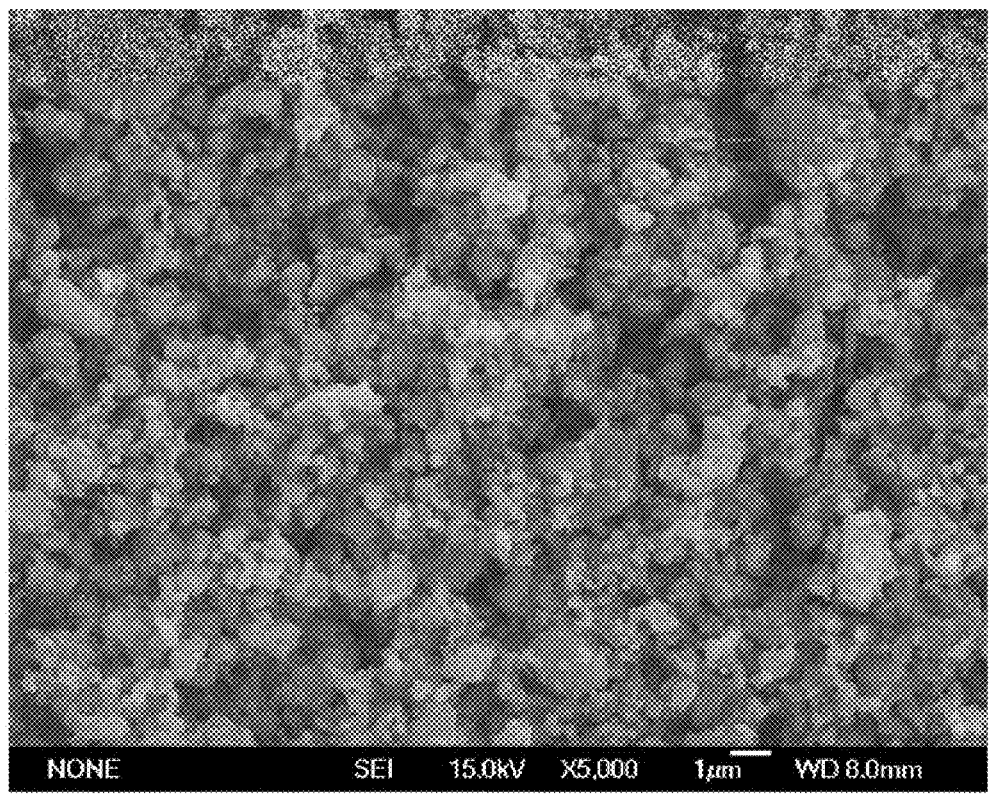

FIG. 1 shows the X-ray diffraction (XRD) pattern of (A) the above synthesized material and (B) the reference pattern for olivine structure $LiFePO_4$. As observed in FIG. 1 the XRD shows that the synthesized material has the same pattern as the standard $LiFePO_4$ olivine crystal structure without impurities. FIG. 2 shows a scanning electron micrograph image of this sample at (A) a magnification 30,000× and (B) a magnification 5,000×. In FIG. 2A, the diameter of particles 220, 230, 240, 250 and 260 are 183, 141, 126, 233 and 322 nm and the horizontal and vertical diameter of particle 210 is 157 and 244 nm respectively. Thus, based on FIG. 2, the synthesized $LiFePO_4$/carbon composite material has a majority of particles with particle size in the approximately 50-300 nm range. Further, no significant aggregation was observed in FIG. 2. Importantly, the synthesized material forms nanoparticles.

Figure 3:
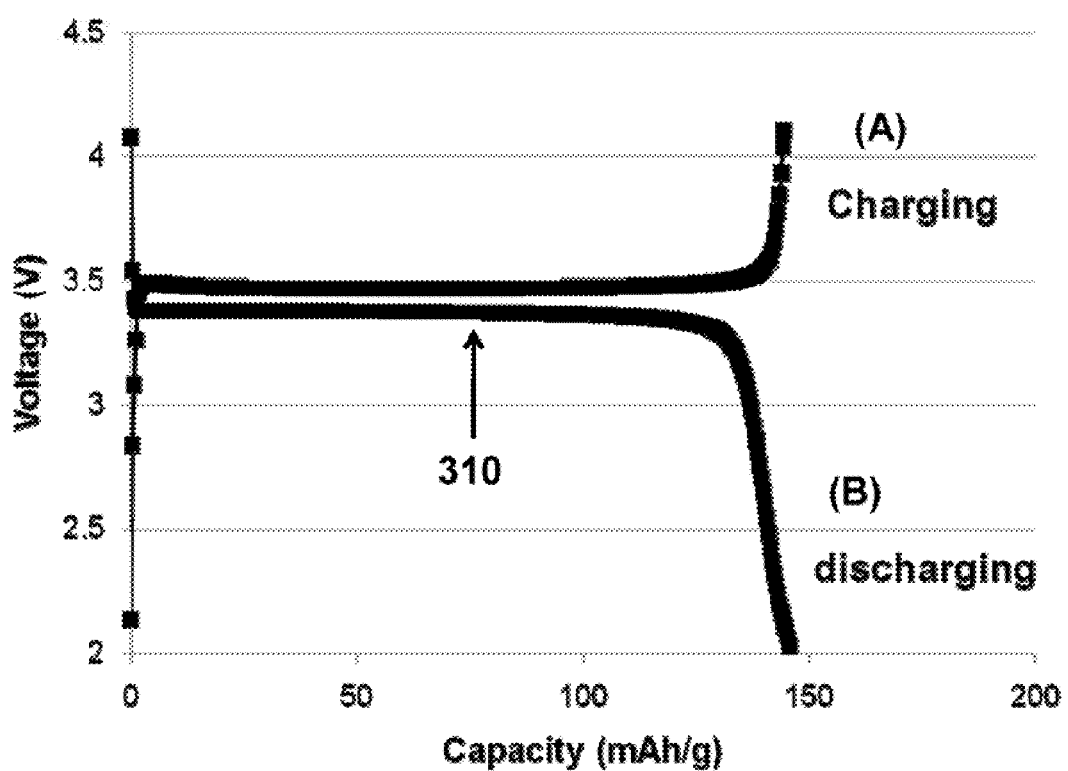
FIG. 3 shows (A) the charging and (B) the discharging profile of an electrochemical cell with the sample synthesized in Example 1 according to an embodiment of the invention as the cathode.
Figure 4:
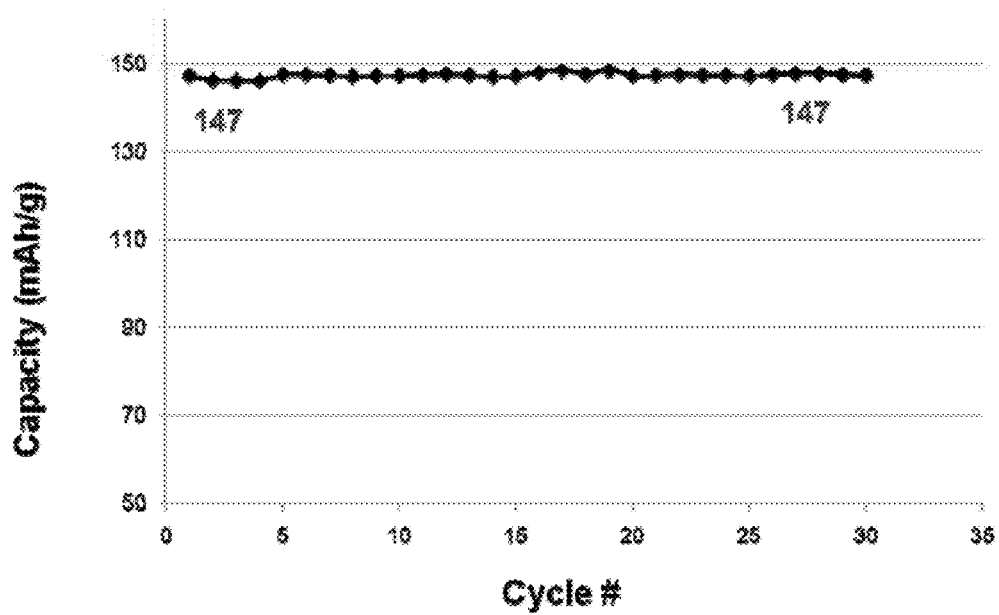
FIG. 4 shows the cycling at 0.5 C charging and discharging rates of an electrochemical cell with the sample synthesized in Example 1 according to an embodiment of the invention as the cathode.

Electrochemical performance of the composite cathode materials was performed using a self-designed pouch cell as well as the commercially available Hosen cell. Cathode material was first fabricated onto aluminum foil with PVDF and Super-P Li™ carbon. Li metal was used as the anode and 1 mol $LiPF_6$ (in EC/DMC, 1:1 (volume ratio)) was used as the electrolyte. FIG. 3 is a plot of voltage versus capacity which shows (A) the charging and (B) the discharging profile of this electrochemical cell at 0.5 C rate from approximately 2.0 to approximately 4.1 V. FIG. 3 shows a capacity of approximately 147 mAh/g. Approximately in this range is equivalent to ±10 mAh/g. A discharging plateau 310 at approximately 3.4 V is clearly shown in FIG. 3. Approximately in this range is equivalent to ±0.15 V. The 310 plateau is attributed to the potential of $Fe^{3+}/Fe^{2+}$. The synthesized material shows excellent cycling performance. FIG. 4 is a plot of capacity versus cycle number which shows the cycling at approximately 0.5 C charging and discharging rates of an electrochemical cell with this synthesized material as the cathode. As shown in FIG. 4, after approximately 30 cycles, there is no capacity loss observed.

EXAMPLE 2

Undoped

LiFePO$_4$/Carbon

In an embodiment of the invention, the LiFePO$_4$/carbon composite material can be synthesized by in-situ decomposition of an organic compound. In an embodiment of the invention the synthesis was as follows: 84 g of iron metal powder (−325 mesh, Alfa Aesar, 98% purity) was mixed with 106.5 g of P$_2$O$_5$ (98%, Acros Organics). Then 500 mL of DI water was added to the mixture drop wise with vigorous stirring. To promote the reaction of iron metal powder, H$_2$O$_2$ (35% solution in water, Alfa Aesar) was added to the wet slurry after addition of the DI water was completed. The obtained wet ball mill slurry was mixed and dried. The product was then mixed in a ball mill with 37.0 g of Li$_2$CO$_3$ (Alfa Aesar, 99% purity) and 7.5 g of glucose (Alfa Aesar) to homogeneity. After milling, the mixture was calcined at the final temperature in inert gas flow to obtain the final LiFePO$_4$/carbon composite materials. In various embodiments of the invention, the mixture can be calcined above a lower limit of approximately 7×10$^{2}$° K. In various embodiments of the invention, the mixture can be calcined up to an upper limit of approximately 1.2×10$^{3}$° K.

Figure 5:
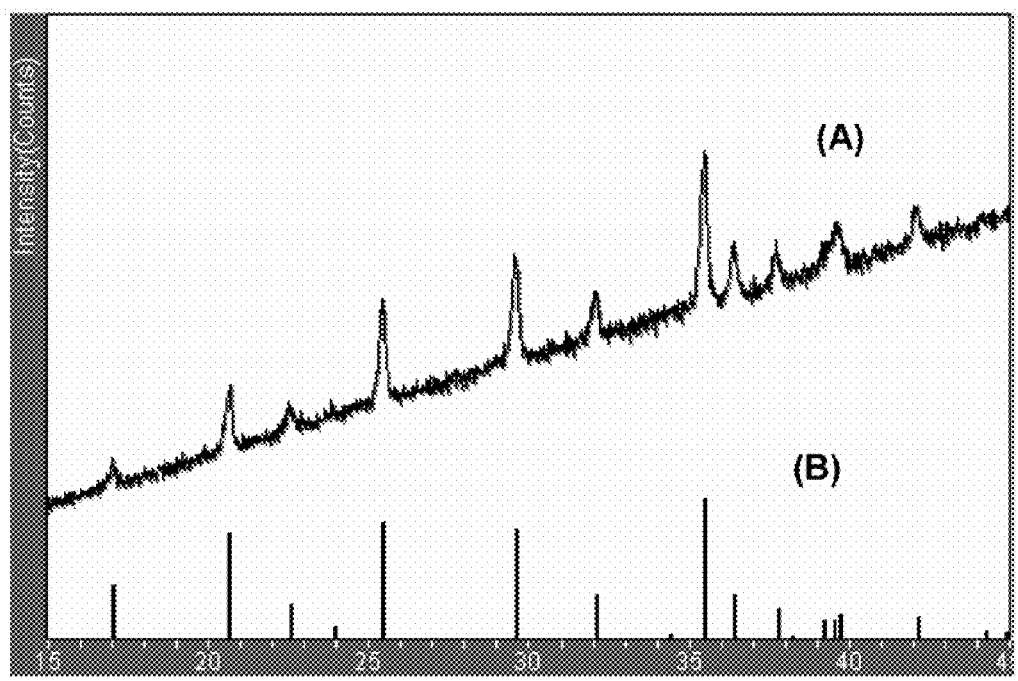
FIG. 5 shows the X-ray diffraction pattern of (A) the sample synthesized in Example 2 and (B) the reference pattern for the olivine structure, $LiFePO_4$ according to an embodiment of the invention.
Figure 6A:
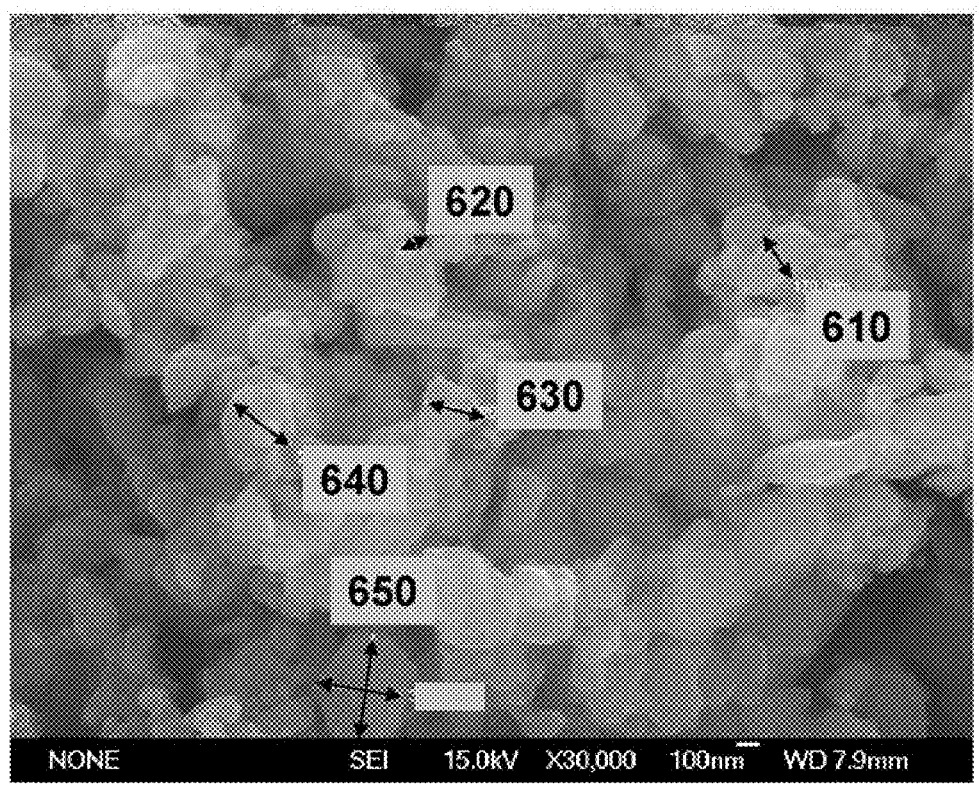
FIG. 6 shows a scanning electron micrograph image of the sample synthesized in Example 2 according to an embodiment of the invention at (A) a magnification 30,000× and (B) a magnification 5,000×.
Figure 6B:
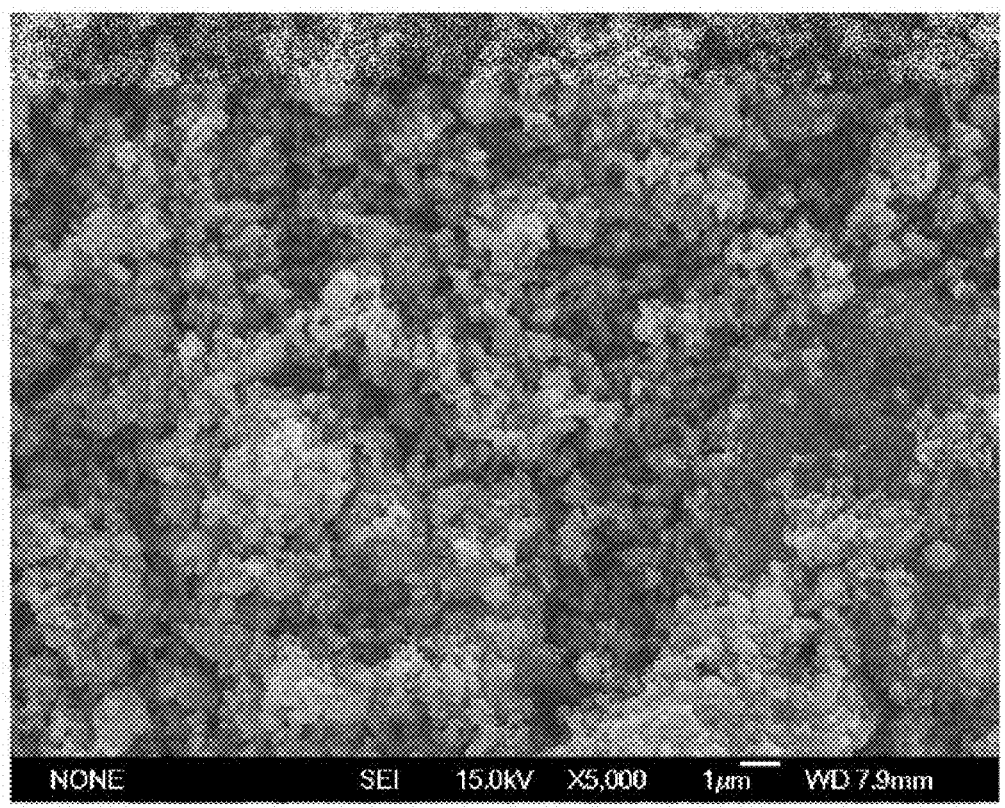

FIG. 5 shows the X-ray diffraction pattern (XRD) of (A) the above synthesized material and (B) the reference pattern for olivine structure LiFePO$_4$. As observed in FIG. 5 the XRD shows that the synthesized material has the same pattern as the standard LiFePO$_4$ olivine crystal structure without impurities. FIG. 6 shows a scanning electron micrograph image of this sample at (A) a magnification 30,000× and (B) a magnification 5,000×. In FIG. 6A, the diameter of particles 610, 620, 630 and 640 are 170, 99, 206 and 291 nm and the horizontal and vertical diameter of particle 650 is 333 and 524 nm respectively. FIG. 6 shows that the synthesized LiFePO$_4$/carbon composite material has a majority of particles with particle size in the approximately 50-500 nm range. Based on FIG. 6, no significant aggregation was observed. Importantly, the synthesized material forms nano-particles.

Figure 7:
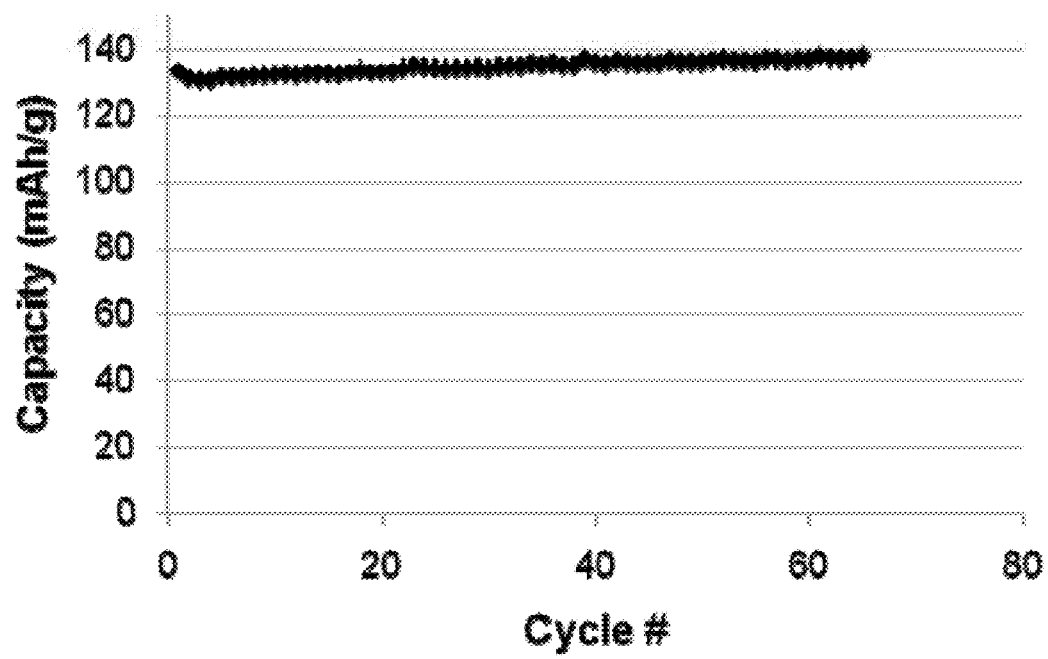
FIG. 7 shows the cycling at 0.5 C charging and discharging rates of an electrochemical cell with the sample synthesized in Example 2 according to an embodiment of the invention as the cathode.

Electrochemical performance of the composite cathode materials was performed using a self-designed pouch cell as well as the commercially available Hosen cell. Cathode material was first fabricated onto aluminum foil with PVDF and Super-P Li™ carbon. Li metal was used as the anode and approximately 1 mol LiPF$_6$ (in EC/DMC) was used as the electrolyte. FIG. 7 is a plot of capacity versus cycle number which shows the cycling performance of this electrochemical cell. As shown in FIG. 7, the initial capacity of the material is approximately 133 mAh/g at a approximately 0.5 C discharging rate. It was noted that with cycling, the capacity actually increased, so that at the 65th cycle, the capacity reaches approximately 140 mAh/g.

EXAMPLE 3

Mixed Metal Li$m_1$M$_2$Po$_4$/Carbon (Started From M$_1$ And M$_2$ Metals)

LiFe$_{0.7}$Co$_{0.3}$PO$_4$/Carbon Composite Material

In an embodiment of the invention, mixed metal LiM$_1$M$_2$PO$_4$ can be synthesized with metallic powder of M$_1$ and M$_2$. In an embodiment of the present invention, synthesis of LiFe0.7Co0.3PO$_4$/carbon was follows: 14.2 g of P$_2$O$_5$ (98%, Acros Organics), 7.8 g of iron powder (−325 mesh, Alfa Aesar, 98% purity), and 3.5 g of cobalt powder (−325 mesh, Alfa Aesar, 99.5% purity) were first mixed together. Then 100 mL of DI water was added to the mixture drop-wise with vigorous stirring. The obtained wet slurry was mixed and dried. The product was then mixed with a ball mill with 7.4 g of Li$_2$CO$_3$ (Alfa Aesar, 99% purity) and 1.5 g of Super P Li™ carbon to homogeneity. After milling, the mixture was calcined at a final temperature (approximately 1×10$^{3}$° K) in inert gas flow to obtain the final LiFePO$_4$/carbon composite materials. In various embodiments of the invention, the mixture can be calcined above a lower limit of approximately 7×10$^{2}$° K. In various embodiments of the invention, the mixture can be calcined up to an upper limit of approximately 1.2×10$^{3}$° K.

Figure 8:
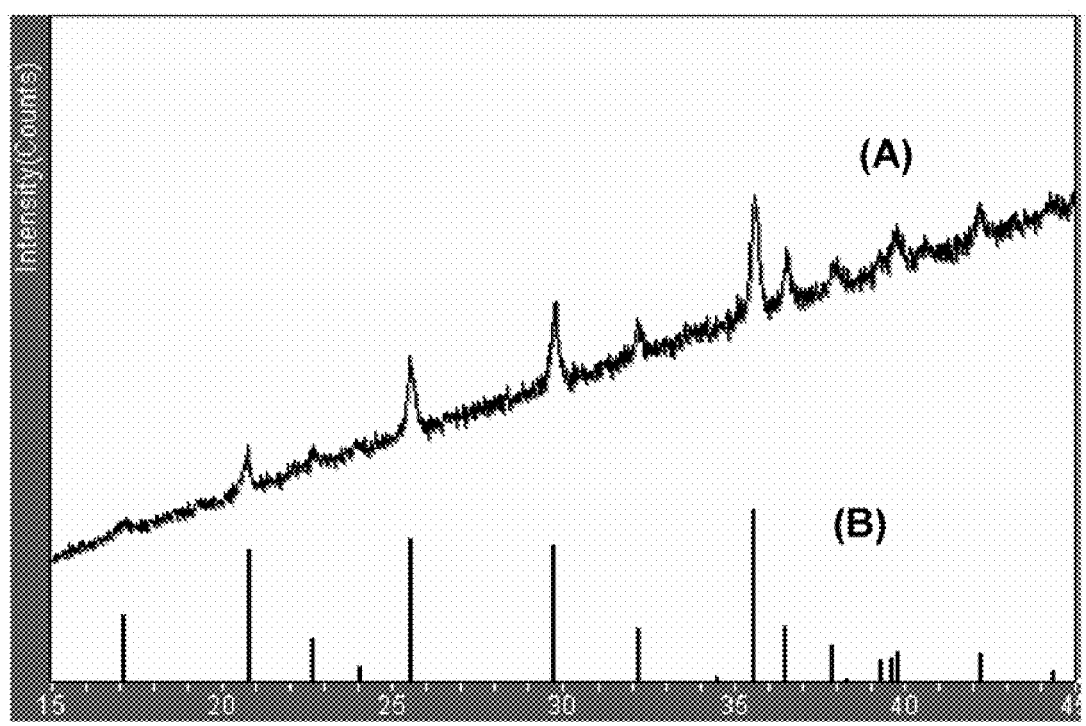
FIG. 8 shows the X-ray diffraction pattern of (A) the sample synthesized in Example 3 according to an embodiment of the invention and (B) the reference pattern for the olivine structure, $LiFePO_4$.
Figure 9A:
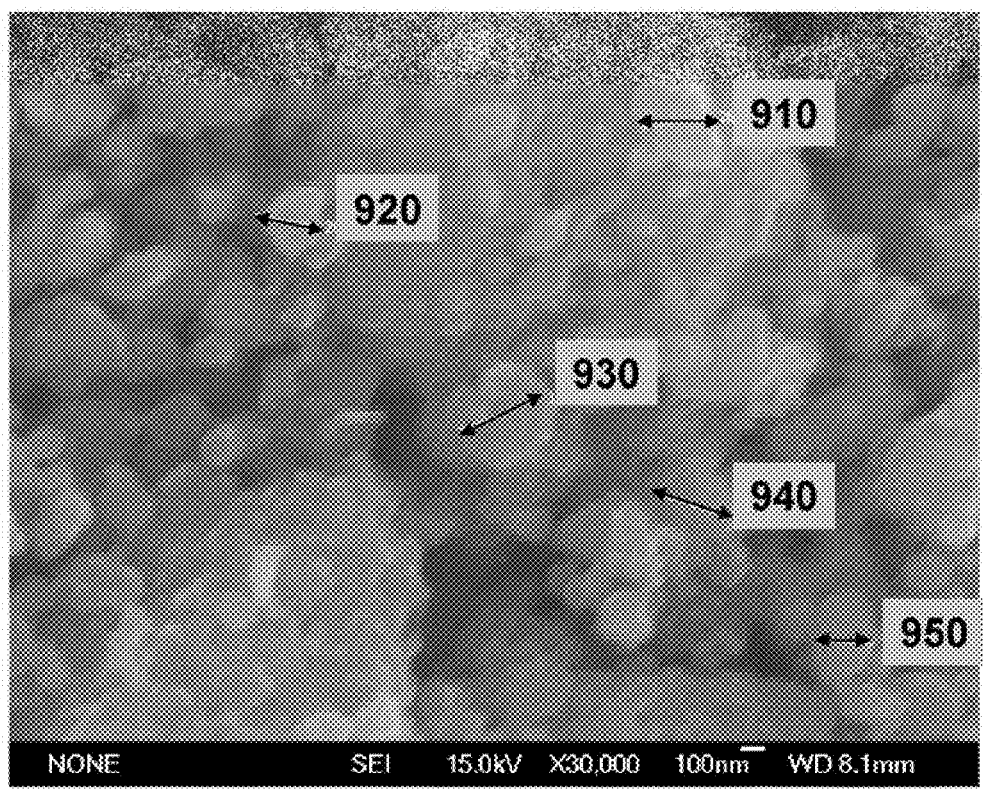
FIG. 9 shows a scanning electron micrograph image of the sample synthesized in Example 3 according to an embodiment of the invention at (A) a magnification 30,000× and (B) a magnification 5,000×.
Figure 9B:
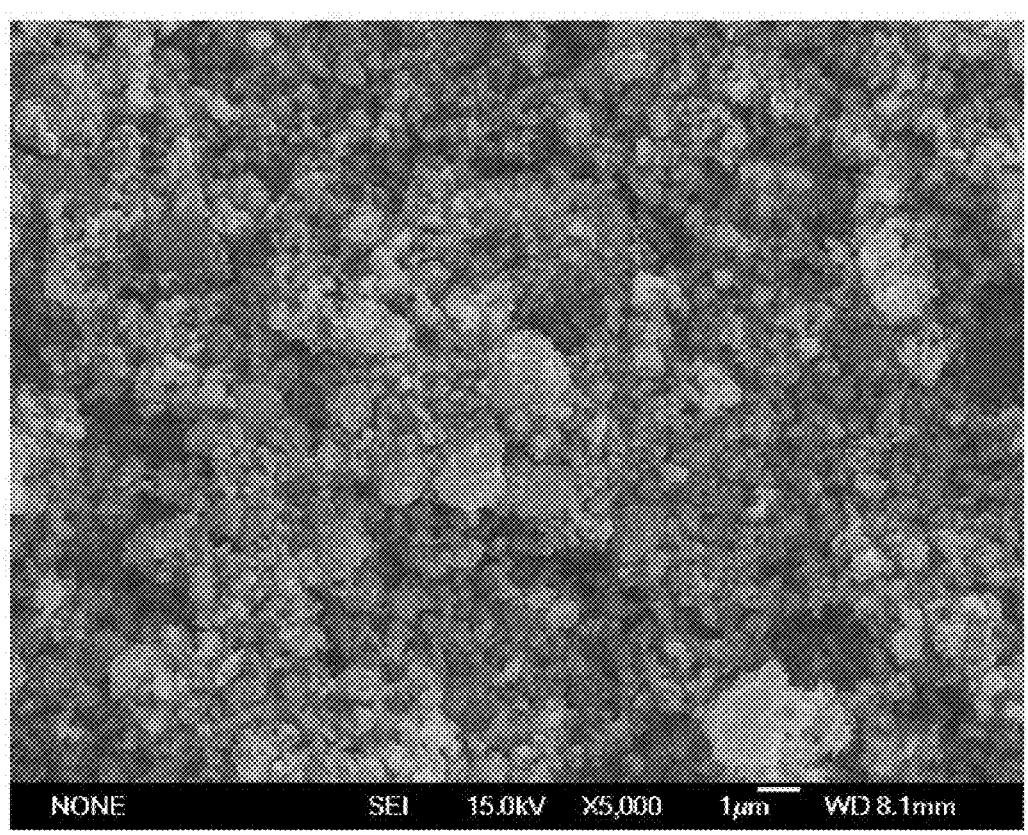

FIG. 8 shows the X-ray diffraction pattern (XRD) of (A) the above synthesized material and (B) the reference pattern for olivine structure LiFePO$_4$. FIG. 8 shows the synthesized material has the same XRD pattern as the standard LiFePO$_4$ olivine crystal structure without impurities. Addition of cobalt to the system (Co/Fe=3/7 in this case) does not produce an extra phase(s) compared to the LiFePO$_4$ structure. This indicates the successful mixing of metal into the crystal structure of olivine LiFePO$_4$ when cobalt metal is used as the cobalt precursor. FIG. 9 shows a scanning electron micrograph image of this sample at (A) a magnification 30,000× and (B) a magnification 5,000×. In FIG. 9A, the diameter of particles 910, 920, 930, 940 and 950 are 291, 260, 359, 305 and 229 nm respectively. FIG. 9 shows that the synthesized LiFeCoPO$_4$/carbon composite material has a majority of particles with particle size in the approximately 200-400 nm range without significant aggregation. Importantly, the synthesized material forms nano-2particles.

Figure 10:
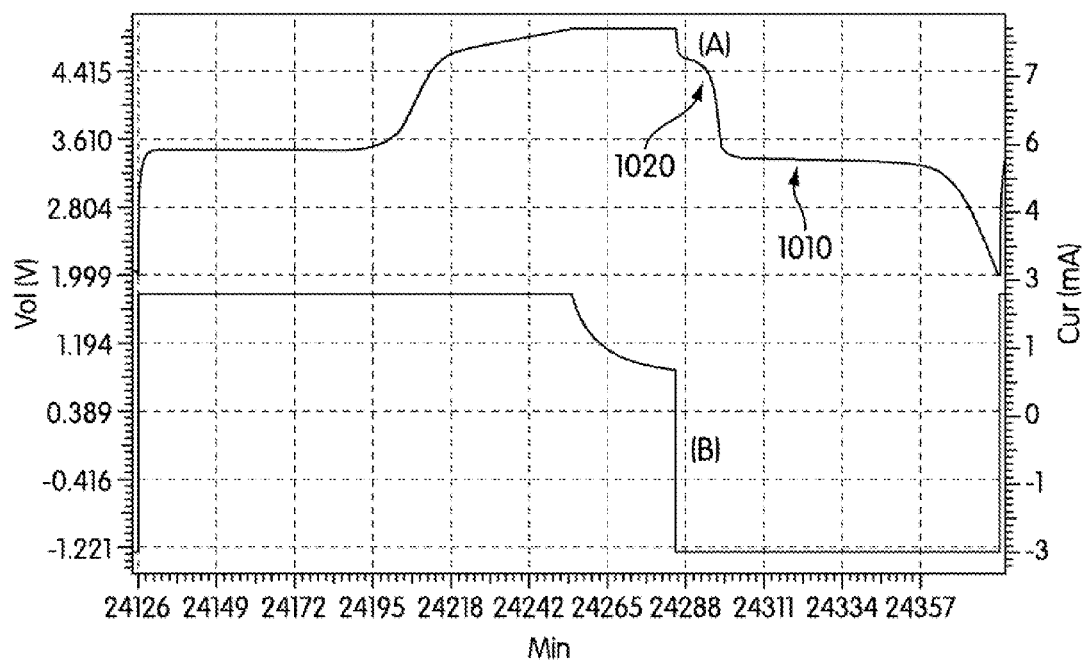
FIG. 10 shows (A) the charging and (B) the discharging profile of an electrochemical cell with the sample synthesized in Example 3 according to an embodiment of the invention as the cathode.
Figure 13:
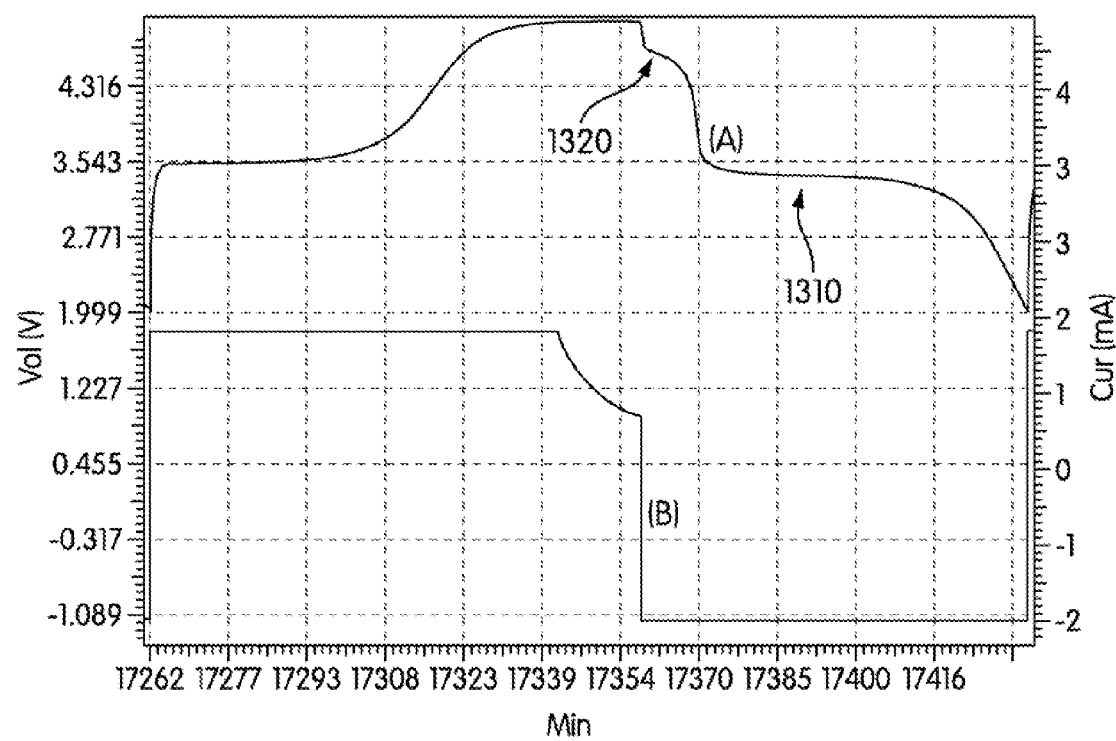
FIG. 13 shows (A) the charging and (B) the discharging profile of an electrochemical cell with the sample synthesized in Example 4 according to an embodiment of the invention as the cathode.

Electrochemical performance of the composite cathode materials was performed using a self-designed pouch cell as well as the commercially available Hosen cell. Cathode material was first fabricated onto aluminum foil with PVDF and Super-P Li™ carbon. Li metal was used as the anode and 1 mol of LiPF$_6$ (in EC/DMC) was used as the electrolyte. FIG. 10 is a plot of voltage versus capacity which shows the charging-discharging profile of the Co-doped LiFePO$_4$/carbon composite material. In FIG. 10 the presence of a second discharging plateau, 1020, at approximately 4.6 V in addition to the plateau, 1010, at approximately 3.4 V can be observed. The 1010 plateau is attributed to the Fe$^{3+}$/Fe$^{2+}$ reaction (FIG. 13). The 1020 second discharging plateau is attributed to Co$^{3+}$/Co$^{2+}$ reaction in the LiFePO$_4$ olivine host structure. The 1020 plateau result agreed well with the XRD pattern indicating the successful doping of cobalt into the crystal structure of LiFePO$_4$ host materials. Importantly, both the charging-discharging profile and the XRD pattern indicate that cobalt is not present as an impurity. Rather, cobalt is present in the solid phase as LiFe$_{0.7}$Co$_{0.3}$PO$_4$, where two discharging plateaus are created. The discharging voltage of this Co-doped LiFePO$_4$/carbon composite material can be up to approximately 4.95 V (in the range of approximately 2.0 to approximately 4.95 V). Thus the discharging voltage can be higher than single metal LiFePO$_4$, (c.f., 4.1 V in the range approximately 2.0 to approximately 4.1 V). The capacity of this mixed metal LiFe$_{0.7}$Co$_{0.3}$PO$_4$/carbon composite material is approximately 111 mAh/g. Thus, the capacity is higher than the typical value of approximately 100 mAh/g for LiCoPO$_4$. The higher voltage discharging plateau (approximately 4.6 V) gives structurally mixed metal LiFeM$_2$PO$_4$ material broader applications than un-doped LiFePO$_4$. For example, a battery made from structure mixed metal LiFePO$_4$ cathode materials can be used for electronics applications which require a voltage of approximately 4.6 V. In contrast, un-doped LiFePO$_4$ can only be used for applications where the voltage requirement is below approximately 4.1 V.

EXAMPLE 4

Single Metal with Metal Doping LiM$_1$M$_2$PO$_4$ (Start from M$_1$ Metal and Use Metal Salt/Metal Oxide of M$_2$)

LiFe$_{0.7}$Co$_{0.3}$PO$_4$/Carbon Composite Material

In an embodiment of the invention, mixed metal LiFe$_{0.7}$Co$_{0.3}$PO$_4$ can be synthesized using cobalt oxide as the cobalt precursor. In an embodiment of the invention, synthesis of LiFe$_{0.7}$Co$_{0.3}$PO$_4$/carbon composite materials can be carried out as follows: first, 14.2 g of P$_2$O$_5$ (98%, Acros Organics) and 7.8 g of iron powder (−325 mesh, Alfa Aesar, 98% purity) were mixed together. Then 100 mL of DI water was added to the mixture drop-wise with vigorous stirring. Next, 4.8 of cobalt oxide, Co$_3$O$_4$ (Alfa Aesar, 99% purity) was added to the wet slurry. The obtained wet ball mill slurry was mixed and dried. The product was then mixed in a ball mill with 7.4 g of Li$_2$CO$_3$ (Alfa Aesar, 99% purity) and 1.5 g of Super P Li™ carbon to homogeneity. After milling, the mixture was calcined at the final temperature in inert gas flow to obtain the LiFe$_{0.7}$Co$_{0.3}$PO$_4$/carbon composite materials. In various embodiments of the invention, the mixture can be calcined above a lower limit of approximately 7×10$^{2\circ}$ K. In various embodiments of the invention, the mixture can be calcined up to an upper limit of approximately 1.2×10$^{3\circ}$ K.

Figure 11:
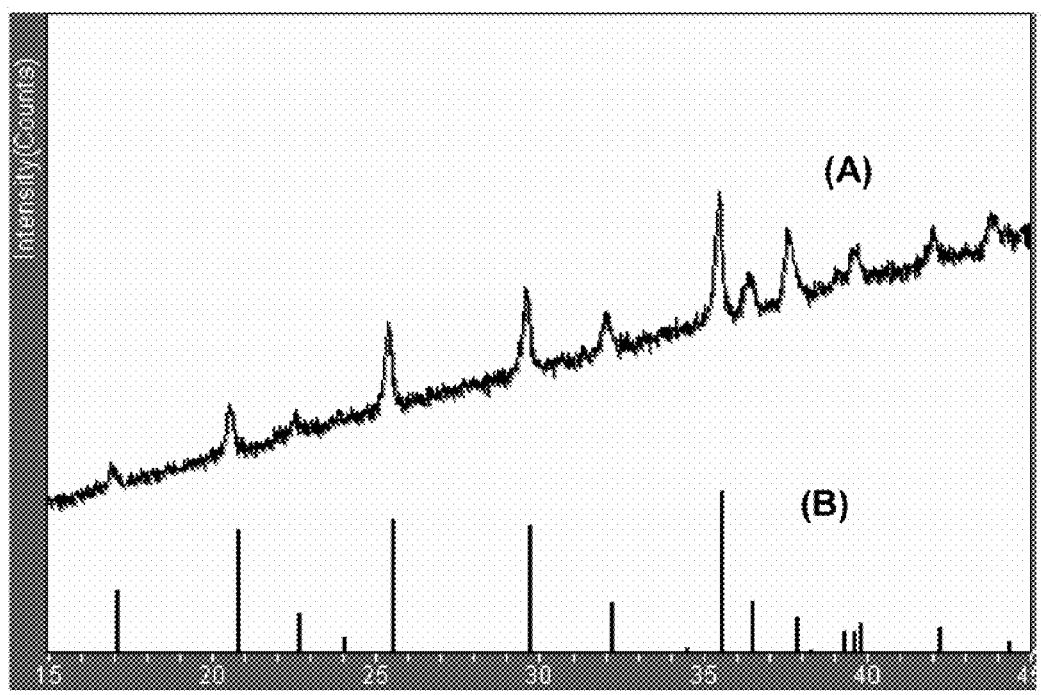
FIG. 11 shows the X-ray diffraction pattern of (A) the sample synthesized in Example 4 according to an embodiment of the invention and (B) the reference pattern for the olivine structure, $LiFePO_4$.
Figure 12A:
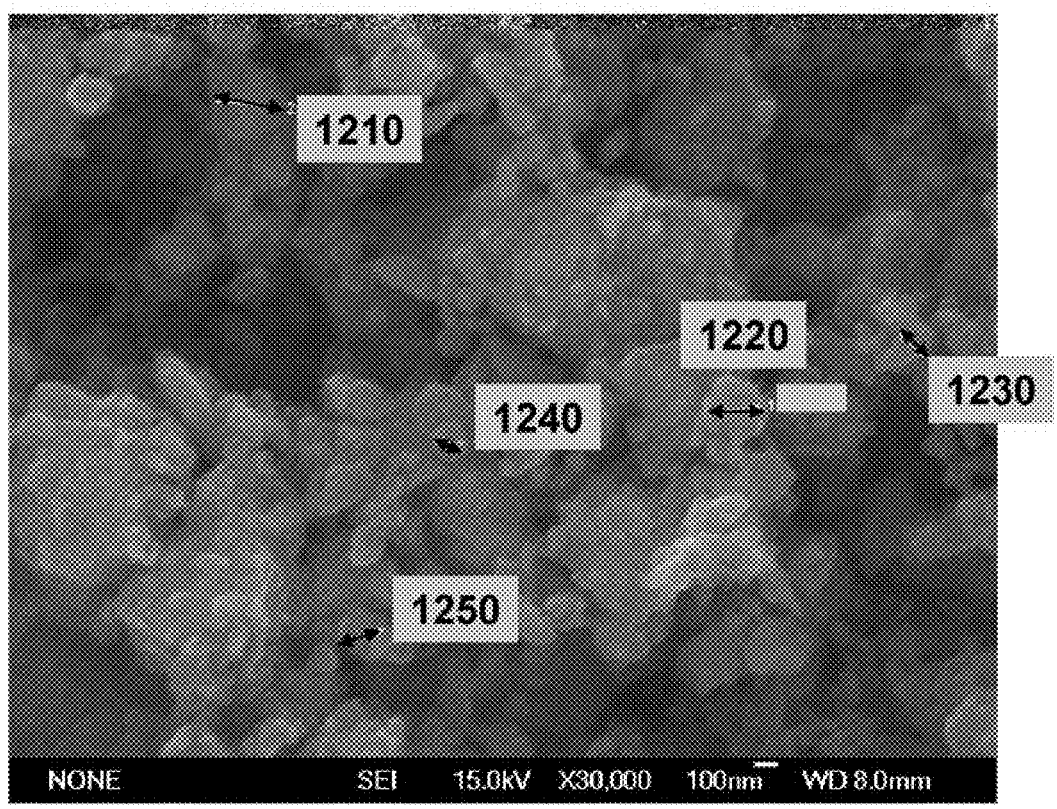
FIG. 12 shows a scanning electron micrograph image of the sample synthesized in Example 4 according to an embodiment of the invention at (A) a magnification 30,000× and (B) a magnification 5,000×.
Figure 12B:
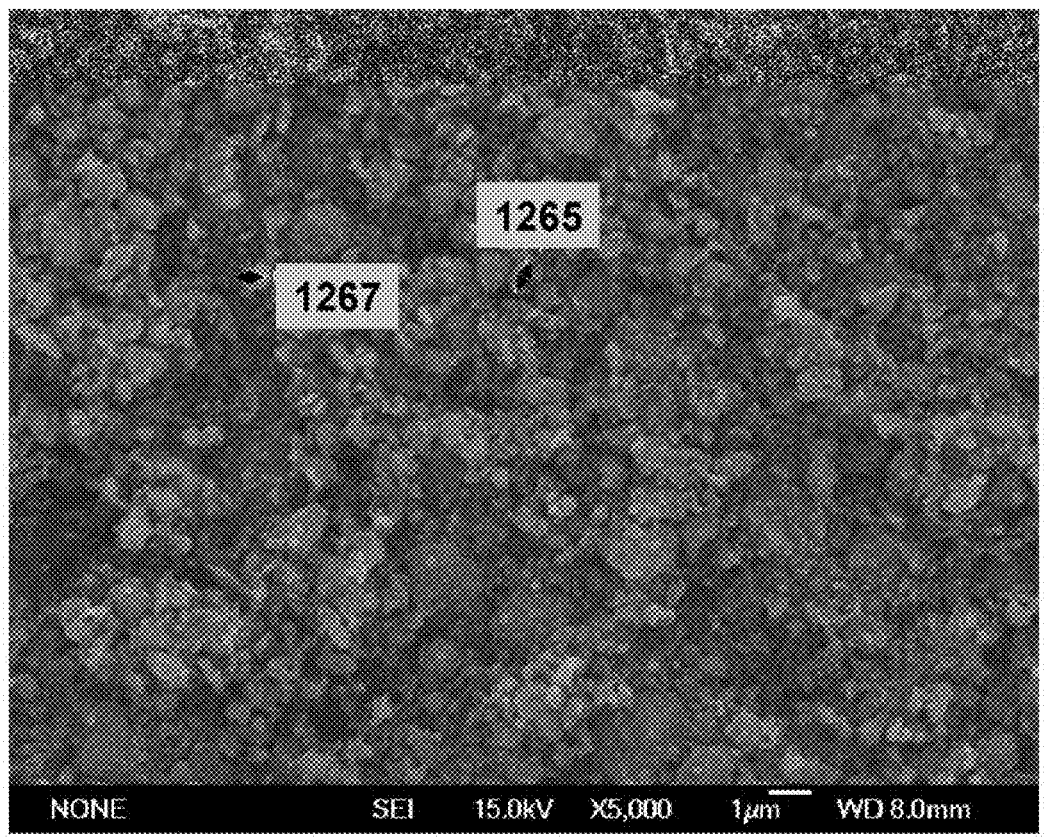

FIG. 11 shows the X-ray diffraction pattern (XRD) of (A) the above synthesized sample and (B) the reference pattern for olivine structure LiFePO$_4$. As observed in FIG. 11 the XRD shows that the synthesized material has the same pattern as the standard LiFePO$_4$ olivine crystal structure without impurities. Addition of cobalt oxide as the cobalt precursor (Co/Fe=3/7 molar ratio) does not produce an extra phase(s) than the LiFePO$_4$ structure. This indicates successful structure mixing of cobalt into the crystal structure of olivine LiFePO$_4$ when cobalt oxide is used as the cobalt precursor. FIG. 12 shows a scanning electron micrograph image of this sample at (A) a magnification 30,000× and (B) a magnification 5,000×. In FIG. 12A, the diameter of particles 1210, 1220, 1230, 1240 and 1250 are 258, 195, 133, 113 and 174 nm respectively. In FIG. 12B, the diameter of particles 1265 and 1267 are 819 and 567 nm respectively. FIG. 12 shows that the synthesized LiFeCoPO$_4$/carbon composite material has a majority of particles with particle size in the approximately 100-800 nm range without significant aggregation. Importantly, the synthesized material generally forms nano-particles.

Electrochemical performance of the composite cathode materials was performed using a self-designed pouch cell as well as the commercially available Hosen cell. Cathode material was first fabricated onto aluminum foil with PVDF and Super-P® Li Carbon. Li metal was used as the anode and 1 mol LiPF$_6$ (in EC/DMC) was used as the electrolyte. FIG. 13 is a plot of voltage versus capacity which shows the charging-discharging profile of the cobalt doped LiFePO$_4$/carbon composite material. As shown in FIG. 13, the presence of a second discharging plateau, 1320, at approximately 4.6 V in addition to the plateau, 1310, at approximately 3.4 V can be observed. The 1310 plateau is attributed to the Fe$^{3+}$/Fe$^{2+}$ reaction (see FIG. 13). The 1320 second discharging plateau is attributed to Co$^{3+}$/Co$^{2+}$ reaction in the LiFePO$_4$ olivine host structure (also see FIG. 13). The presence of the 1320 plateau agreed well with the XRD result (FIG. 11) indicating the successful doping of cobalt into the crystal structure of LiFePO$_4$ host material. Importantly, cobalt is not present as an impurity, but rather as a solid phase of LiFe$_{0.7}$Co$_{0.3}$PO$_4$ where two discharging plateaus are created. The discharging voltage of this cobalt structure mixed LiFePO$_4$/carbon composite material can be up to approximately 4.95 V (in the range of approximately 2.0 to approximately 4.95 V). This discharging voltage is higher than undoped LiFePO$_4$. The capacity of this cobalt doped LiFePO$_4$/carbon composite material is approximately 89 mAh/g. This is lower than material synthesized using cobalt metal as a precursor (e.g., see Example 3).

EXAMPLE 5

Multiple-Metal LiM1M2M3PO4 (Start from M1, M2, and M3 Metals)

LiFe$_{0.6}$Co$_{0.2}$Mn$_{0.2}$PO$_4$/Carbon Composite Material

In an embodiment of the invention, multiple metal-structure mixed LiFePO$_4$ can be synthesized by using of metallic powders of cobalt, manganese and iron. In an embodiment of the present invention, synthesis of LiFe$_{0.6}$Co$_{0.2}$Mn$_{0.2}$PO$_4$/carbon composite material can be accomplished as follows: 14.2 g of P$_2$O$_5$ (98%, Acros Organics), 6.7 g of iron powder (−325 mesh, Alfa Aesar, 98% purity), 2.4 g of cobalt powder (−325 mesh, Alfa Aesar, 99.5% purity), and 2.2 g of manganese powder (−325 mesh, Alfa Aesar, 99.5% purity) were first mixed together. Then 100 mL of DI water was added to the mixture drop-wise with vigorous stirring. Next, H$_2$O$_2$ (35% solution in water, Alfa Aesar) was added drop-wised to the mixture with stirring. The obtained wet ball mill slurry was mixed and dried. The product was then mixed in a ball mill with 7.4 g of Li$_2$CO$_3$ (Alfa Aesar, 99% purity) and 1.5 g of Super P Li™ carbon. After milling, the mixture was calcined at the final temperature in inert gas flow to obtain the final LiFePO$_4$/carbon composite materials. In various embodiments of the invention, the mixture can be calcined above a lower limit of approximately 7×10$^{2\circ}$ K. In various embodiments of the invention, the mixture can be calcined up to an upper limit of approximately 1.2×10$^{3\circ}$ K.

Figure 14:
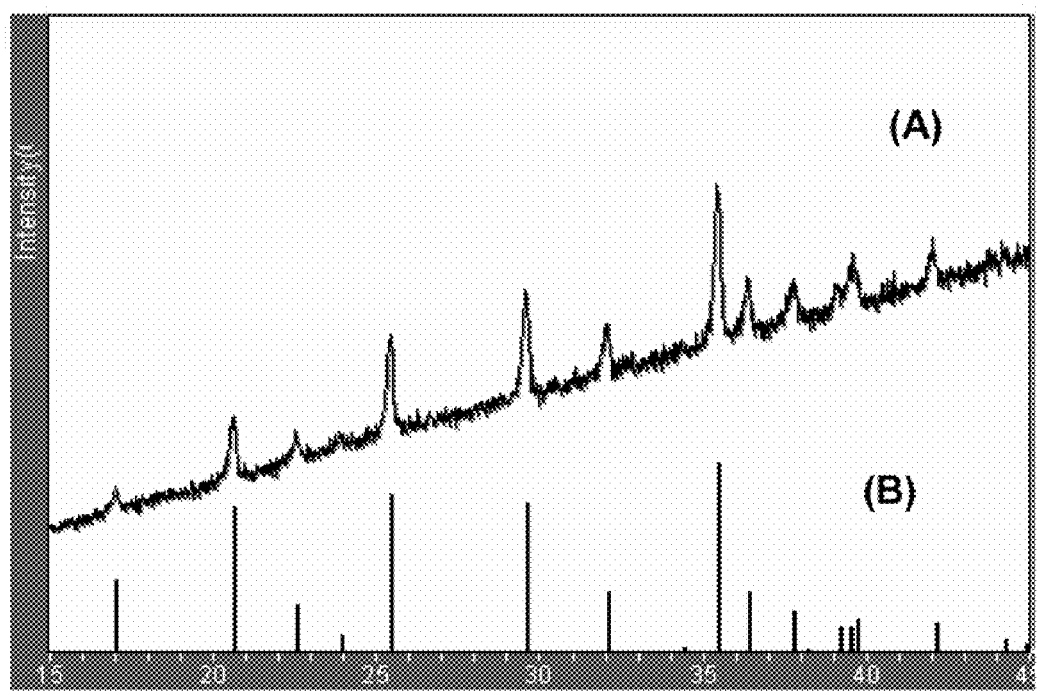
FIG. 14 shows the X-ray diffraction pattern of (A) the sample synthesized in Example 5 according to an embodiment of the invention and (B) the reference pattern for the olivine structure, $LiFePO_4$.
Figure 15A:
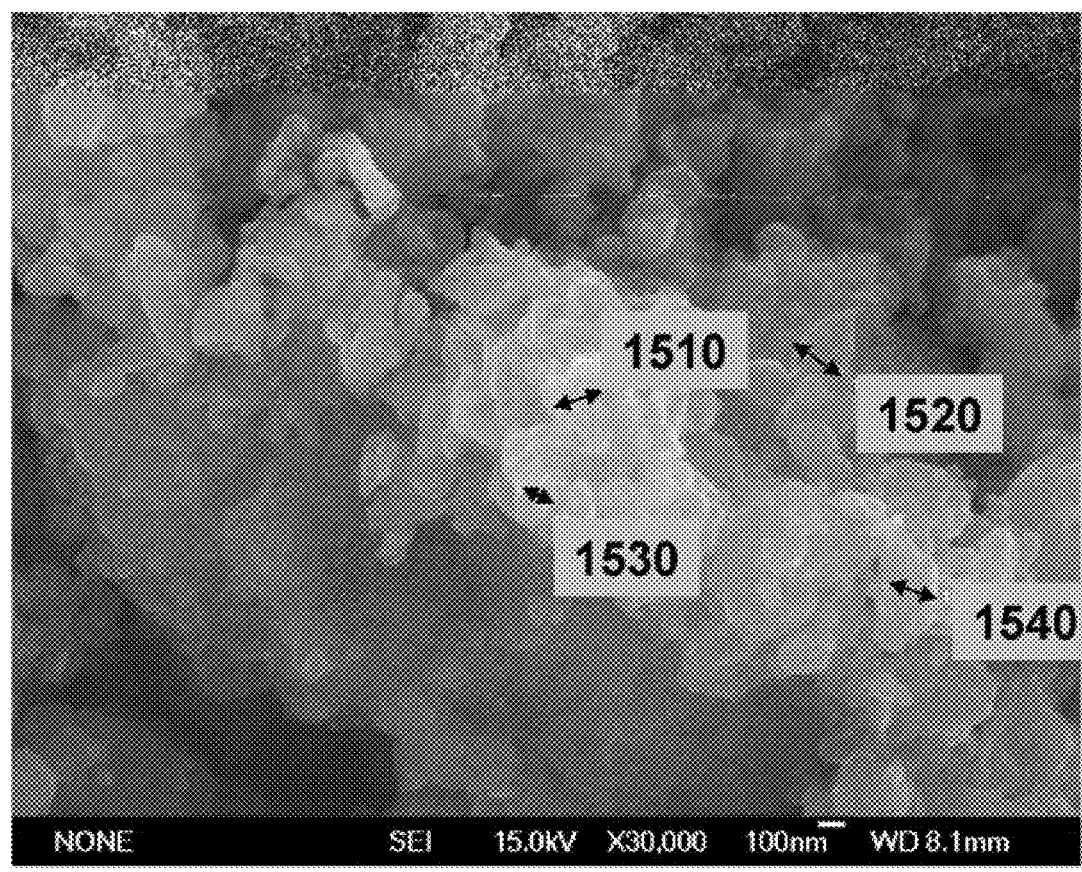
FIG. 15 shows a scanning electron micrograph image of the sample synthesized in Example 5 according to an embodiment of the invention at (A) a magnification 30,000× and (B) a magnification 5,000×.
Figure 15B:
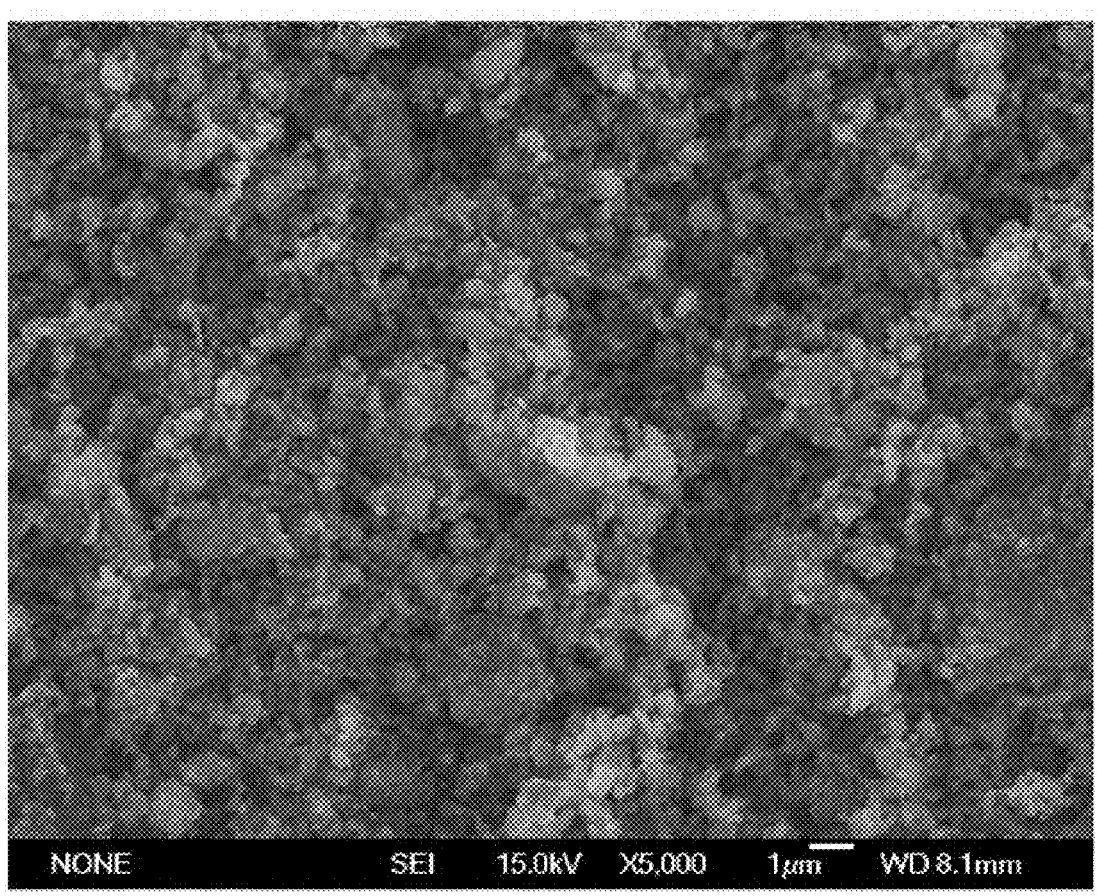

FIG. 14 shows the X-ray diffraction pattern (XRD) of (A) the above synthesized sample and (B) the reference pattern for olivine structure LiFePO$_4$. As observed in FIG. 14 the XRD shows that the synthesized material has the same pattern as the standard LiFePO$_4$ olivine crystal structure without impurities. Thus, after introduction of cobalt and manganese, the material has an olivine crystal structure without impurities. Addition of cobalt and manganese to the reaction system does not produce an extra phase(s) than the LiFePO$_4$ structure. This result indicates the successful introduction of cobalt and manganese into the crystal structure of olivine LiFePO$_4$ when metallic cobalt and manganese metals are used together with metallic Fe powder. FIG. 15 shows a scanning electron micrograph image of this sample at (A) a magnification 30,000× and (B) a magnification 5,000×. In FIG. 15, the diameter of particles 1510, 1520, 1530 and 1540 are 146, 200, 131 and 193 nm respectively. FIG. 15 shows that the synthesized LiFeCoMnPO$_4$/carbon composite material has a majority of particles with particle size in the approximately 100-250 nm range. Based on FIG. 15, no significant aggregation was observed. Importantly, the synthesized material generally forms nano-particles.

Figure 16:
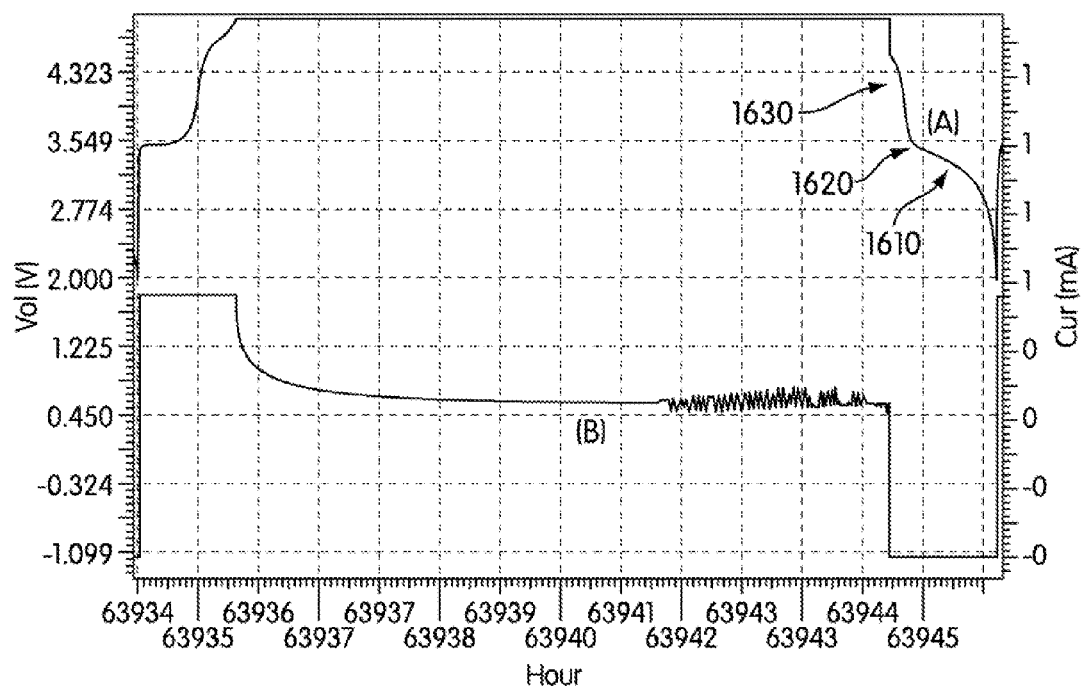
FIG. 16 shows (A) the charging and (B) the discharging profile of an electrochemical cell with the sample synthesized in Example 5 according to an embodiment of the invention as the cathode.

Electrochemical performance of the composite cathode materials was performed using a self-designed pouch cell as well as the commercially available Hosen cell. Cathode material was first fabricated onto aluminum foil with PVDF and Super-P Li™ carbon. Li metal was used as the anode and 1 mol $LiPF_6$ (in EC/DMC) was used as the electrolyte. FIG. 16 is a plot of voltage versus capacity which shows the charging-discharging profile of the Co, Mn co-doped $LiFePO_4$/carbon composite material. FIG. 16 clearly shows the presence of three discharging plateaus 1610, 1620 and 1630. The first plateau, 1610, is observed at approximately 3.1 V and is attributed to the $Fe^{3+}/Fe^{2+}$ redox couple. The second plateau, 1620, is observed at approximately 3.5 V and is attributed to the $Mn^{3+}/Mn^{2+}$ redox couple. The third plateau, 1630, is observed at approximately 4.4 V and is attributed to the $Co^{3+}/Co^{2+}$ redox couple (see FIG. 16). The presence of discharging plateaus, 1630 and 1620, in addition to that of 1610 is strong evidence of doping of Co and Mn into the crystal structure of $LiFePO_4$. This result is in good agreement with the XRD results (see FIG. 14). The $Fe^{3+}/Fe^{2+}$ redox potential is slightly changed from approximately 3.3 V to approximately 3.1 V. This can possibly be due to the presence of Co and Mn in the crystal structure changing the environment around the Fe ions. The three-discharge-plateau feature makes the system very different from other non doped or singly doped $LiFePO_4$ materials. With three-discharge-plateaus, the battery made from this material can be tuned for application with different voltage requirement in the range of 2.0 V to 4.95 V. In addition, compared to the cobalt doped $LiFePO_4$ shown in Examples 3 and 4, the extra plateau, 1620, makes the discharging from 4.95 V to 3.3V smoother. As a result, the energy density for this electrochemical cell will be higher. The capacity of this $LiM_1M_2M_3PO_4$/carbon composite material is approximately 126 mAh/g.

EXAMPLE 6

Multiple-Metal $LiM_1M_2M_3PO_4$ (Start from Metal Powder of $M_1$ and Use Metal Salts/Oxides of $M_2$ and $M_3$)

$LiFe_{0.6}Co_{0.2}Mn_{0.2}PO_4$/Carbon Composite Material

In various embodiments of the present invention, metal carbonates can be used as dopant precursors to synthesize multiple metal-doped $LiFePO_4$/carbon composite material. In an embodiment of the present invention, the synthesis of $LiFe_{0.6}Co_{0.2}Mn_{0.2}PO_4$/carbon composite material can be accomplished as follows: 14.2 g of $P_2O_5$ (98%, Acros Organics) and 6.7 g of iron powder (−325 mesh, Alfa Aesar, 98% purity) were first mixed together. Then 100 mL of DI water was added to the mixture drop-wise with vigorous stirring. Next, $H_2O_2$ (35% solution in water, Alfa Aesar) was added drop-wised to the mixture, followed by addition of 3.2 g cobalt oxide, $Co_3O_4$ (Alfa Aesar, 99% purity) and 3.5 g manganese oxide, $MnO_2$ (325 mesh, Alfa Aesar, 99.9% purity) with stirring. The obtained wet ball mill slurry was mixed and dried. The product was then mixed in a ball mill with 7.4 g of $Li_2CO_3$ (Alfa Aesar, 99% purity) and 1.5 g of Super P Li™ carbon to homogeneity. After milling, the mixture was calcined at the final temperature in inert gas flow to obtain the final $LiFePO_4$/carbon composite materials. In various embodiments of the invention, the mixture can be calcined above a lower limit of approximately $7\times10^{2°}$ K. In various embodiments of the invention, the mixture can be calcined up to an upper limit of approximately $1.2\times10^3$.

Figure 17:
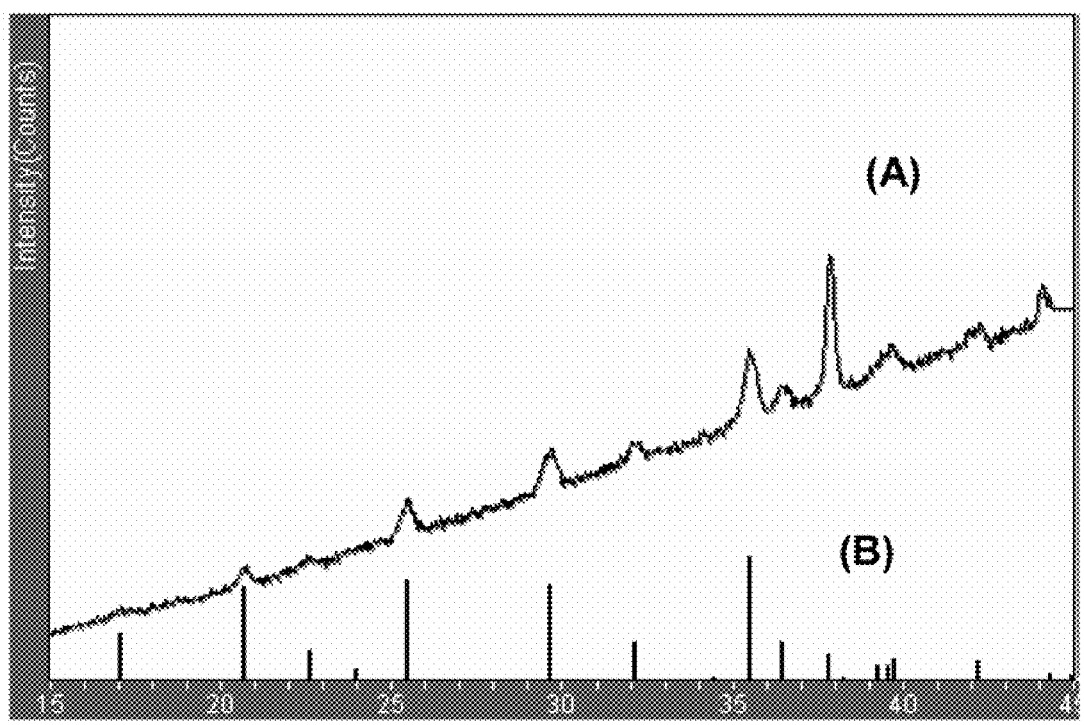
FIG. 17 shows the X-ray diffraction pattern of (A) the sample synthesized in Example 6 according to an embodiment of the invention and (B) the reference pattern for the olivine structure, $LiFePO_4$.
Figure 18A:
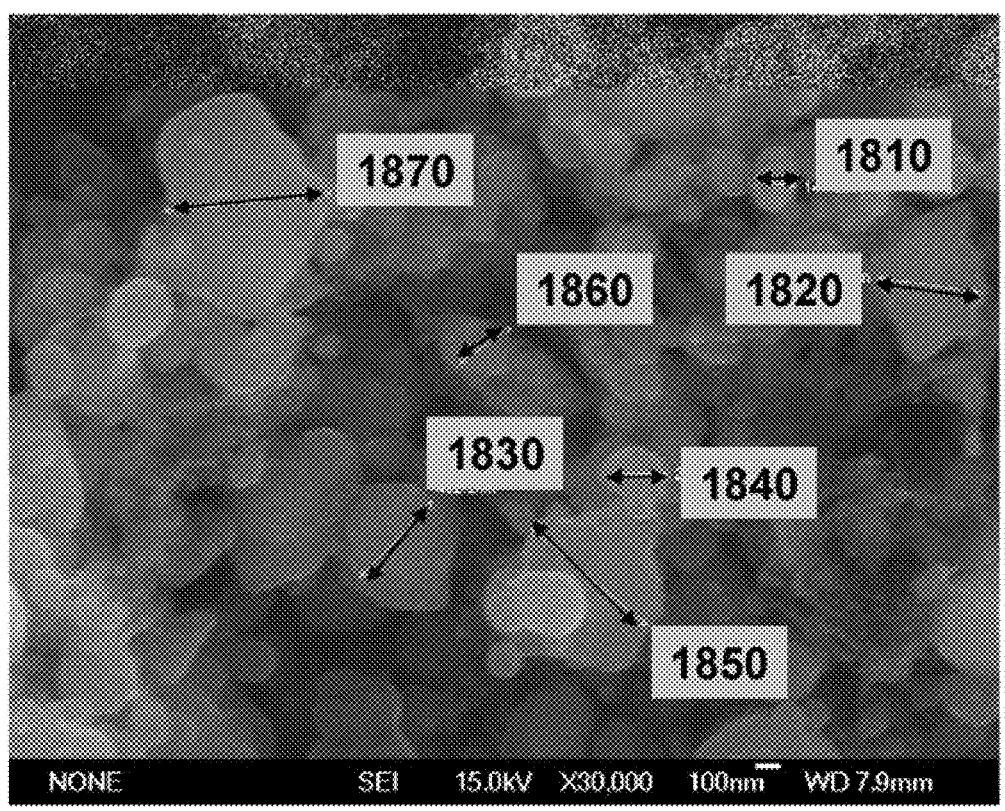
FIG. 18 shows a scanning electron micrograph image of the sample synthesized in Example 6 according to an embodiment of the invention at (A) a magnification 30,000× and (B) a magnification 5,000×.
Figure 18B:
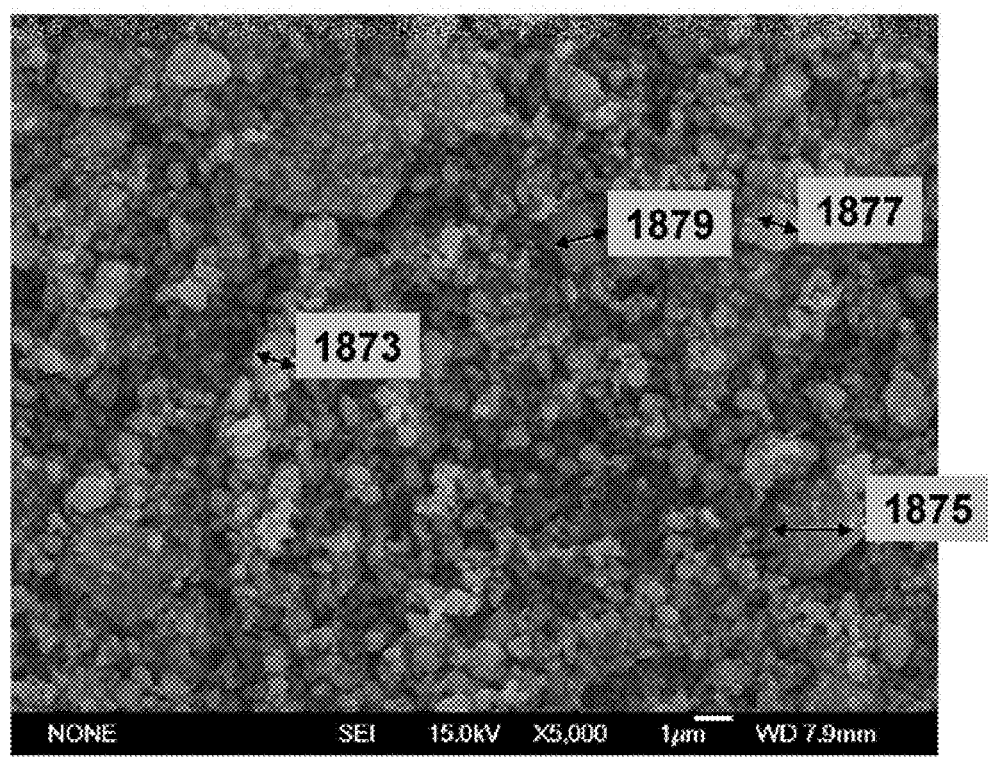

FIG. 17 shows the X-ray diffraction pattern (XRD) of (A) the above synthesized material and (B) the reference pattern for olivine structure $LiFePO_4$. As observed in FIG. 17 the XRD pattern shows that the synthesized material has the same pattern as the standard $LiFePO_4$ olivine crystal structure without impurities. This indicates successful introduction of cobalt and manganese into the crystal structure of olivine $LiFePO_4$ when cobalt carbonate and manganese carbonate are used as the dopant precursors. FIG. 18 shows a scanning electron micrograph image of this sample at (A) a magnification 30,000× and (B) a magnification 5,000×. In FIG. 18A, the diameter of particles 1810, 1820, 1830, 1840, 1850, 1860 and 1870 are 142, 410, 422, 231, 612, 250 and 679 nm respectively. In FIG. 18B, the diameter of particles 1873, 1875, 1877 and 1879 are 778, 2199, 1192 and 1236 nm respectively. FIG. 18 shows that the synthesized $LiFe_{0.6}Co_{0.2}Mn_{0.2}PO_4$/carbon composite material has a majority of particles with particle size in the approximately 100-1200 nm range with some degree of aggregation. Importantly, the synthesized material forms many nano-particles.

Figure 19:
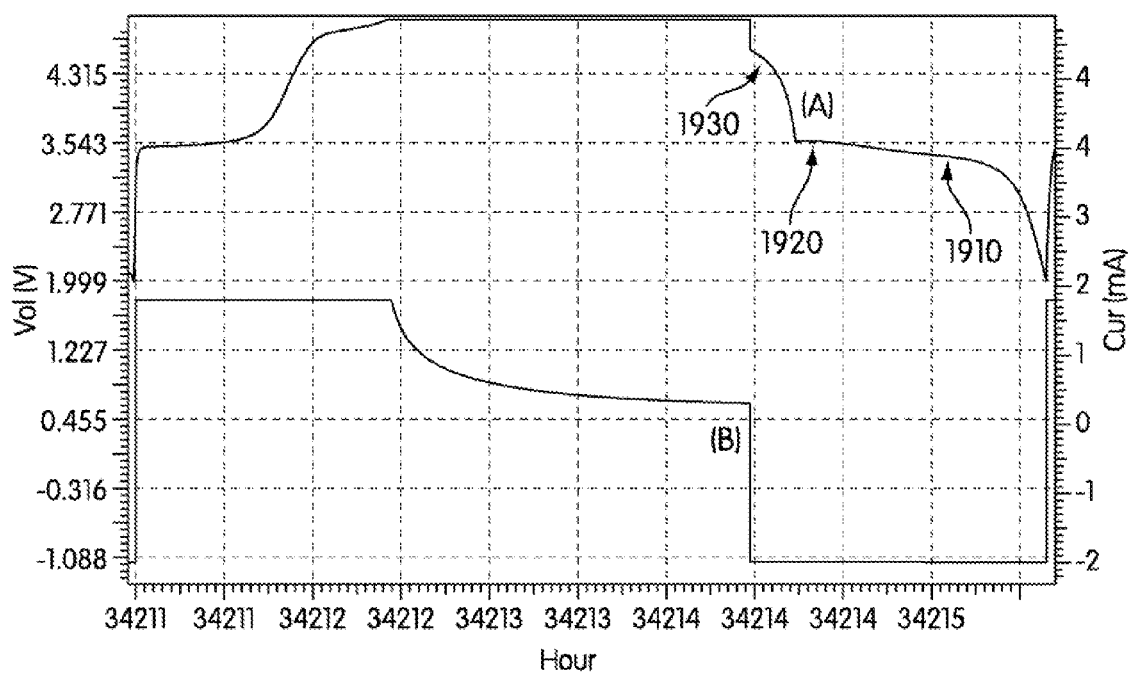
FIG. 19 shows (A) the charging and (B) the discharging profile of an electrochemical cell with the sample synthesized in Example 6 according to an embodiment of the invention as the cathode.

Electrochemical performance of the composite cathode materials was performed using a self-designed pouch cell as well as the commercially available Hosen cell. Cathode material was first fabricated onto aluminum foil with PVDF and Super-P Li™ carbon. Li metal was used as the anode and 1 mol $LiPF_6$ (in EC/DMC) was used as the electrolyte. FIG. 19 is a plot of voltage versus capacity which shows the charging-discharging profile of the Co, Mn co-doped $LiFePO_4$/carbon composite material. FIG. 19 clearly shows the presence of three discharging plateaus 1910, 1920 and 1930. The first plateau 1910 is observed at approximately 3.1 V and is attributed to the $Fe^{3+}/Fe^{2+}$ redox couple. The second plateau 1920 is observed at approximately 3.5 V and is attributed to the $Mn^{3+}/Mn^{2+}$ redox couple. The third plateau 1930 is observed at approximately 4.4 V and is attributed to the $Co^{3+}/Co^{2+}$ redox couple (see FIG. 19). The presence of discharging plateaus, 1930 and 1920, in addition to that of 1910 is strong evidence of doping of Co and Mn into the crystal structure of $LiFePO_4$. This result is in good agreement with the XRD results (see FIG. 17).

The $Fe^{3+}/Fe^{2+}$ redox potential is slightly changed from approximately 3.3 V to approximately 3.1 V. This change can possibly be due to the presence of Co and Mn in the crystal structure changing the environment around the Fe ions. This three-discharge-plateau feature makes the system very different from other non-doped or singly doped $LiFePO_4$ materials. With three-discharge-plateau, the battery made from this material can be tuned for application with different voltage requirement in the range of 2.0 V to 4.95 V. In addition, compare to cobalt replaced $LiFePO_4$ shown in Examples 3 and 4, the extra plateau, 1920, makes the discharging from 4.95 V to 3.3 V smoother. As a result, the energy density of this electrochemical cell will be higher. The capacity of this Co, Mn structure mixed $LiFePO_4$ carbon composite material is approximately 99 mAh/g. This capacity is lower than the material synthesized using cobalt and manganese metals as metal precursors (see Example 5).

Structure introduction of other metals with similar characteristics to cobalt and manganese can be employed, within the spirit and scope of the invention. In other embodiments of the invention, different sources of the metals can be used, as understood by a review of the specification, the claims, and the figures.

What is claimed is:

1. A method of producing a $Li_wM^1_xM^2_yZO_4$/carbon composite material comprising:
   (a1) reacting at least one $M^1$ precursor with at least one $ZO_4$ precursor in an aqueous based solvent, wherein the at least one $M^1$ precursor has an oxidation state <1, wherein Z is selected from the group consisting of P, Si, S, Al, Ge, N, and V;
   (a2) adding an accelerator to the aqueous based solvent;
   (b) drying the reaction;
   (c) mixing the dried reaction with a lithium precursor;

(d) adding one or both a dopant and a carbon precursor to the mixture, wherein the dopant is at least a $M^2$ precursor, wherein $M^2$ is a metal element; and (e) calcining the doped mixture.

2. The method of claim 1, wherein the $M^1$ precursor is one or more of:
(i) a powder; and
(ii) selected from the group consisting of Fe, Co, Ni, and Mn.

3. The method of claim 1, wherein Z is one or more of:
(iv) phosphorous and the $PO_4$ precursor is selected from the group consisting of $P_2O_5$ and $H_3PO_4$;
(v) silicon and the $SiO_4$ precursor is selected from the group consisting of $SiO_2$, $H_2SiO_3$, $H_4SiO_4$, $NH_4HSiO_3$, $(NH_4)_2SiO_3$ and $(NH4)_{4-w}H_wSiO_4$ (where w=0, 1, 2 or 3);
(vi) sulfur and the $SO_4$ precursor is selected from the group consisting of $H_2SO_4$, $NH_4HSO_4$, and $(NH_4)_2SO_4$;
(vii) aluminum and the $AlO_4$ precursor is selected from the group consisting of $Al_2O_3$, $Al(OH)_3$ and $AlNH_4(SO_4)_2$;
(viii) germainum and the $GeO_4$ precursor is selected from the group consisting of $GeSe_2$, GeO, $GeO_2$, $Ge_2O_3$, $Ge_2O_7$ and $SiGeO_2$;
(ix) nitrogen and the $NO_4$ precursor is selected from the group consisting of $HNO_3$, $NH_3$, $Q_3N_2$ (where Q is a divalent metal) and $R_3N$ (where R is a monovalent metal); and
(x) vanadium and the $VO_4$ precursor is selected from the group consisting of $V_2O_3$, $VO_2$, VO, $V_2O_5$, $VOSO_4$, $NaVO_3$, and $Na_3VO_4$.

4. The method of claim 1, wherein one or both of:
(xi) the dopant referred to in step (d) includes the at least one $M^1$ precursor added in step (a); and
(xii) the dopant referred to in step (d) is added in step (c).

5. The method of claim 1, wherein the accelerator is selected from the group consisting of $O_2$, $H_2O_2$, $HClO_4$, and $Cl_2$.

6. The method of claim 1, wherein one or more of:
(xiii) the reacting in step (a) occurs in one or both a wet ball mill slurry and a sol gel slurry;
(xiv) the drying in step (b) is carried out in air; and
(xv) the mixing in step (c) includes one or more of grinding, milling and blending.

7. The method of claim 1, wherein one or more of:
(xvi) the drying in step (b) is carried out at a temperature between:
a lower limit of approximately $1.5 \times 10^2$ ° K; and
an upper limit of approximately $7.5 \times 10^2$ ° K;
(xvii) the lithium precursor added in step (c) is selected from the group consisting of
a carbamate salt;
a hydroxide salt; and
an acetate salt..

8. The method of claim 1, wherein the dopant added in step (d) is one or more of:
(xviii) a metal selected from the group consisting of Mg, Al, Si, Ca, Sc, Ti, V, Cr, Mn, Fe, Co, Ni, Cu, Zn, Ga, Ge, Sr, Zr, Nb, Mo, Ta, W, La, Ce, Pr, Nd, Pm, Sm, Eu, Gd, Tb, Dy, Ho, Er, Tm, Yb and Lu;
(xix) a salt; and
(xx) an oxide.

9. The method of claim 1, wherein the carbon precursor is one or more of:
(xxi) added before one or both the mixing step (c) and the calcining step (e);
(xxii) conductive carbon black;
(xxiii) selected from one or more sugar molecules selected from the group consisting of monosaccharides, disaccharides and polysaccharides, including one or more sugar units selected from the group consisting of ribose, arabinose, xylose, lyxose, fructose, galactose, glucose and mannose; and
(xxiv) selected from one or more oxygen and carbon containing polymers selected from the group consisting of one or more of polyether, polyglycol, polyester, polyethylene, poly(halogen)ethylene, polypropylene, polyvinylidene halogen, polymethylmethacrylate, polyacrylonide, polycaprolactone, polylactide, poly butylene succinate, polybutylene succinate adipate, polybutylene succinate terephthalate, poly-hydroxypropionate, poly-hydroxybutyrate, poly-hydroxyvalerate, poly-hydroxyhexanoate, poly-3-hydroxyoctanoate, poly-3-hydroxyphenylvaleric acid and poly-3-hydroxyphenylhexanoic acid; and
(xxv) uniformly dispersed throughout the composite material produced.

10. The method of claim 1, wherein the calcination is carried out with one or more conditions selected from the group consisting of:
(xxvi) an inert environment;
(xxvii) a reducing environment;
(xxviii) under vacuum;
(xxix) using microwave heating;
(xxx) using convection heating;
(xxxi) using conduction heating; and
(xxxii) wherein the calcining temperature is between:
a lower limit of approximately $7 \times 10^2$ ° K; and
an upper limit of approximately $1.2 \times 10^3$ ° K.

11. A method of producing a $Li_wM^1_xM^2_yZO_4$/carbon composite material as a cathode for a rechargeable cell comprising:
(a1) reacting at least one $M^1$ precursor, wherein $M^1$ is a metal element with at least one $ZO_4$ precursor in an aqueous based solvent, wherein Z is selected from the group consisting of P, Si, S, Al, Ge, N, and V;
(a2) adding an accelerator to the aqueous based solvent;
(b) milling the mixture in one or both a wet ball mill slurry and a sol gel slurry;
(c) drying the reaction;
(d) mixing the dried reaction with a lithium precursor in a ball mill;
(e) adding one or both a dopant and a carbon precursor to the mixture, wherein the dopant is at least a $M^2$ precursor, wherein $M^2$ is a metal element, wherein the dopant does not include the at least one $M^1$ precursor selected in step (a);
(f) calcining the doped mixture in an inert or reducing environment; and
(g) fabricating the $Li_wM^1_xM^2_yZO_4$/carbon, composite material into a cathode in a rechargeable cell.

12. The method of claim 11, wherein the $M^1$ precursor reacted with at least one $ZO_4$ precursor in step (a) is one or more of:
(g) a metal with an oxidation state of zero;
(h) a powder; and
(i) selected from the group consisting of Fe, FeO, $Fe_2O_3$, $Fe_3O_4$, $Fe_2O_5$, Co, CoO, $Co_2O_3$, $Co_3O_4$, Ni, NiO, $Ni_2O_3$, $NiO_2H$, Mn, MnO, $MnO_2$, $Mn_2O_3$, $MnO_3$, $MnO_6$, $Mn_2O_7$, $Mn_3O_4$ and $Mn_5O_8$.

13. The method of claim 11, wherein the $M^1$ precursor and the $M^2$ precursor is selected from the group consisting of an iron precursor and a cobalt precursor and Z is phosphorous.

14. The method of claim 11, wherein the $Li_wM^1_xM^2_yZO_4$/carbon composite material cathode includes nano size particles with size between:
  a lower limit of approximately $1\times10^1$ nm; and
  an upper limit of approximately $1\times10^3$ nm.

15. The method of claim 11, wherein the $Li_wM^1_xM^2_yZO_4$/carbon composite material cathode impedance is between:
  a lower limit of approximately $1\times10^3$ ohm; and
  an upper limit of approximately $1\times10^4$ ohm.

16. The method of claim 11, wherein the $Li_wM^1_xM^2_yZO_4$/carbon composite material cathode inserted in a rechargeable cell has a specific capacity between:
  a lower limit of approximately 99 mAh/g; and
  an upper limit of approximately 147 mAh/g.

17. The method of claim 11, wherein the $Li_wM^1_xM^2_yZO_4$/carbon composite material cathode inserted in a rechargeable cell has a specific voltage of between:
  a lower limit of approximately 2 V; and
  an upper limit of approximately 5 V; and.

18. The method of claim 11, wherein the $Li_wM^1_xM^2_yZO_4$/carbon composite material cathode inserted in a rechargeable cell has at least three specific discharging plateaus, wherein:
  the first discharging plateau is between:
    a lower limit of approximately 2.8 V; and
    an upper limit of approximately 3.3 V;
  the second discharging plateau is between:
    a lower limit of approximately 3.3 V; and
    an upper limit of approximately 3.9 V; and
  the third discharging plateau is between:
    a lower limit of approximately 4.0 V; and
    an upper limit of approximately 4.8 V.

19. A method of producing a $Li_wM^1_xM^2_yZO_4$/carbon, composite material comprising:
  (a1) reacting at least two metal precursors ($M^1$, $M^2$) with at least one metalloid (Z) precursor in an aqueous based solvent, wherein at least one of the $M^1$ and $M^2$ precursors has an oxidation state of zero, wherein the at least one metalloid precursor is selected from the group consisting of P, Si, S, Al, Ge, N, and V element containing precursors;
  (a2) adding an accelerator to the aqueous based solvent;
  (b) drying the reaction;
  (c) mixing the dried reaction with a lithium precursor;
  (d) adding a carbon precursor; and
  (e) calcining the mixture with microwave heating in an inert or reducing environment at a temperature between:
  a lower limit of approximately $7\times10^2$ °K; and
  an upper limit of approximately $1.2\times10^3$ °K.

\* \* \* \* \*